United States Patent
Watanabe et al.

(10) Patent No.: US 7,445,088 B2
(45) Date of Patent: Nov. 4, 2008

(54) DIFFERENTIAL AND DIFFERENTIAL CASE

(75) Inventors: Takashi Watanabe, Kanagawa (JP); Osamu Takahashi, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 453 days.

(21) Appl. No.: 10/780,587

(22) Filed: Feb. 19, 2004

(65) Prior Publication Data

US 2004/0182647 A1    Sep. 23, 2004

(30) Foreign Application Priority Data

| Mar. 19, 2003 | (JP) | ............................. 2003-075199 |
| Mar. 25, 2003 | (JP) | ............................. 2003-082489 |

(51) Int. Cl.
*F01M 1/00* (2006.01)
*F01M 9/06* (2006.01)
*F16N 7/26* (2006.01)
*F16N 7/28* (2006.01)

(52) U.S. Cl. ..................................... 184/13.1; 475/160

(58) Field of Classification Search ................ 184/13.1, 184/11.1, 11.4; 74/467, 468, 606 R, 606 A; 475/160

See application file for complete search history.

(56) References Cited

U.S. PATENT DOCUMENTS 2,102,973 A  * 12/1937  Porsche ...................... 475/160
5,669,844 A  *  9/1997  Homan et al. ................ 475/160

FOREIGN PATENT DOCUMENTS

| EP | 0 343 146 A2 | 11/1989 |
| JP | 10-138777 A | 5/1998 |
| JP | 2000-266162 A | 9/2000 |

* cited by examiner

*Primary Examiner*—Richard W L Ridley
*Assistant Examiner*—James Pilkington
(74) *Attorney, Agent, or Firm*—Foley & Lardner LLP

(57) ABSTRACT

A differential for a wheeled motor vehicle comprises a differential gear unit, and a differential case for housing therein the differential gear unit. The differential case is rotatable about its rotation axis in normal and reverse directions at a position above an oil level of a lubricating oil. The differential case includes a portion having an oil inlet opening formed therethrough, the oil inlet opening communicating the interior of the differential case with the outside of the same; and an oil dipping up structure that dips up the lubricating oil to force the same to enter the interior of the differential case through the oil inlet opening when the differential case rotates about the rotation axis.

31 Claims, 20 Drawing Sheets

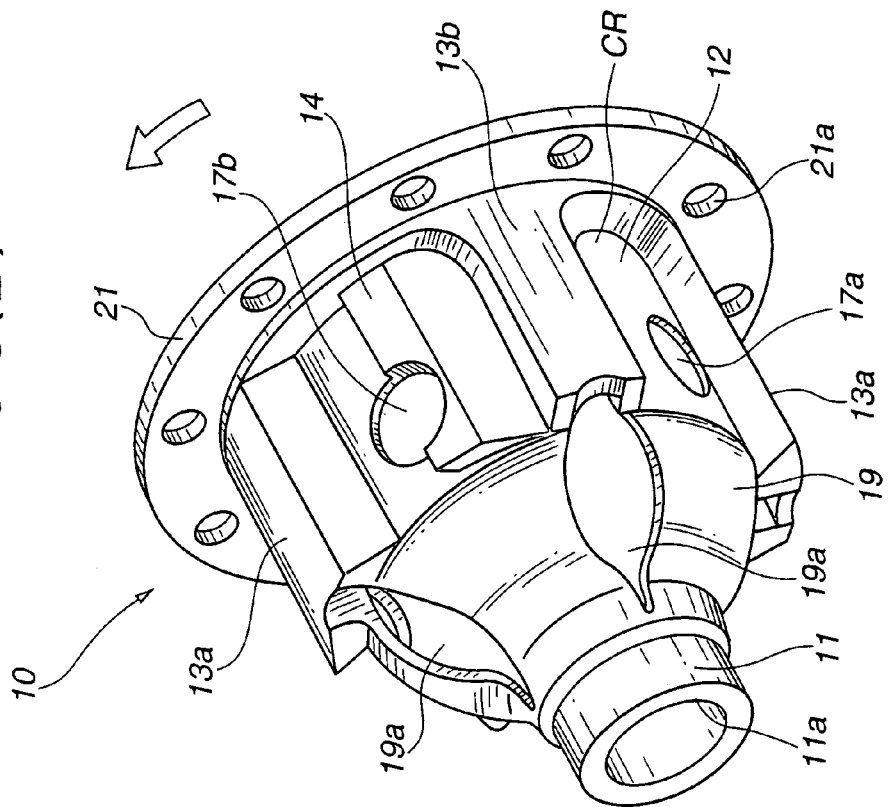
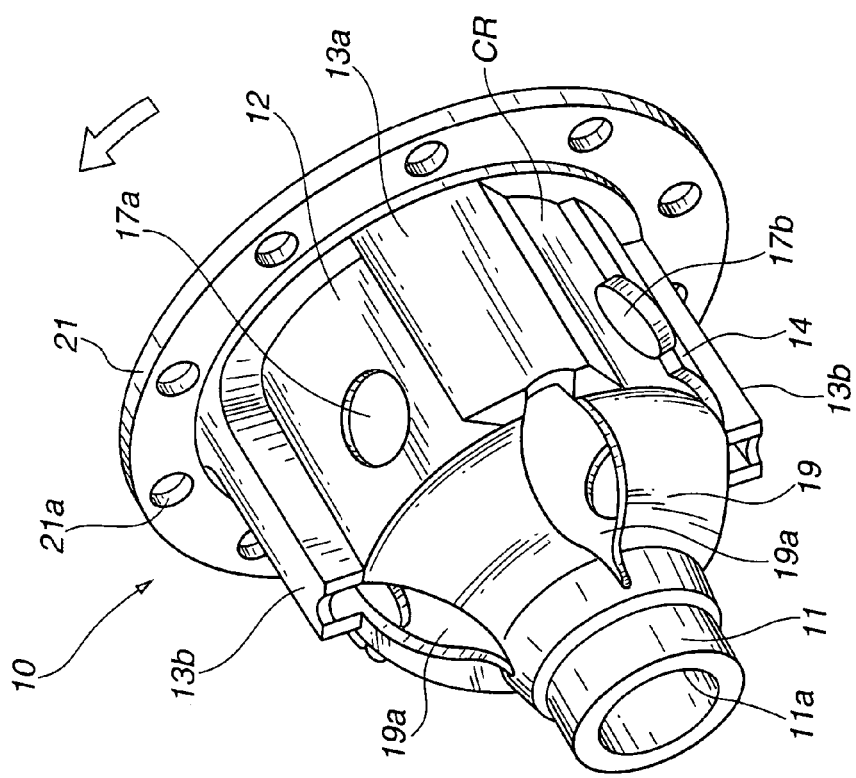

DIFFERENTIAL AND DIFFERENTIAL CASE

BACKGROUND OF THE INVENTION

1. Field of the Invention

The present invention relates in general to a differential for a wheeled motor vehicle, which transmits a driving force from a prime mover, such as, engine, electric motor or the like to drive road wheels of the vehicle. More specifically, the present invention relates to a differential with an improved case (viz., differential case).

2. Description of the Related Art

For improving running performance and fuel consumption of motor vehicles, weight-reduction of the vehicles has been hitherto attempted in various ways. One of them is to reduce the weight of a differential, which is disclosed in, for example, Japanese Laid-open Patent Application (Tokkai) 2000-266162. In the way of this publication, a differential case for the differential is produced through a forging technique not by a casting technique that has been conventionally used. Due the nature of the forging, mechanical strength) of the differential case is increased and thus a so-called thin-walled structure can be provided for the differential case.

Usually, a differential is installed in a carrier case equipped with a lubricating oil pan, and a lower portion of the differential case is immersed in the lubricating oil in the pan. The lower portion of the case is formed with an oil inlet opening. That is, when the differential revolves, the lubricating oil in the pan is led into an interior of the differential case through the oil inlet opening thereby lubricating differential gears installed in the case.

As is known, for keeping the mechanical strength of the differential case at a satisfied level, the size of the oil inlet opening can not be made so large. However, if the opening is too small in size, the amount of the lubricating oil fed to the differential gears is reduced. Furthermore, thinning the wall of the differential case induces reduction in the length between a rotation axis of the case and the apertured lower portion of the case (viz., the outer diameter of the case), which would bring about an insufficient immersion of the oil inlet opening into the lubricating oil in the oil pan. Of course, in this case, the oil feeding to the differential gears becomes poor.

SUMMARY OF THE INVENTION

It is therefore an object of the present invention to provide a differential with an improved differential case, which is free of the above-mentioned drawbacks.

According to a first aspect of the present invention, there is provided a differential for a wheeled motor vehicle, which comprises a differential gear unit; a differential case for housing therein the differential gear unit, the differential case being rotatable about its rotation axis in normal and reverse directions at a position above an oil level of a lubricating oil, wherein the differential case includes a portion having an oil inlet opening formed therethrough, the oil inlet opening communicating the interior of the differential case with the outside of the same; and an oil dipping (i.e., scooping) up structure that dips (i.e., scoops) up the lubricating oil to force the same to enter the interior of the differential case through the oil inlet opening when the differential case rotates about the rotation axis.

According to a second aspect of the present invention, there is provided a differential case for a differential of a wheeled motor vehicle, which comprises a case proper; a portion of the case proper, the portion having an oil inlet opening formed therethrough, the oil inlet opening communicating the interior of the case proper with the outside of the same; and an oil dipping up structure defined by the case proper, the oil dipping up structure dipping up a lubricating oil to force the'same to enter the interior of the case proper through the oil inlet opening when rotated in the lubricating oil about a given rotation axis.

BRIEF DESCRIPTION OF THE DRAWINGS

FIGS. 3(A) and 3(B) are perspective views of a half of the differential of the first embodiment, in which FIG. 3(A) is the view taken from the direction of an arrow "A" of FIG. 2, and FIG. 3(B) is the view taken from the direction of an arrow "B" of FIG. 2;

FIGS. 4(A) and 4(B) are sectional views of an essential portion indicated by an arrow "IV" of FIG. 2, in which FIG. 4(A) is the view showing an inclination of a side surface of a first projected portion, that is positioned at a leading side of the first projected portion with respect to a normal rotation direction, and FIG. 4(B) is the view showing an inclination of an inner wall of a first circular opening, that is positioned at a trailing side of the first circular opening with respect to the normal rotation direction;

FIGS. 5(A) and 5(B) are sectional views of a portion indicated by an arrow "V" of FIG. 2, in which FIG. 5(A) is the view showing an inclination of a stepped portion of a thicker wall portion, and FIG. 5(B) is the view showing an inclination of an inner wall of a second circular opening, that is positioned at a trailing side of the second circular opening with respect to the normal rotation direction;

FIGS. 8(A) and 8(B) are sectional views of an essential portion of the differential of the second embodiment, in which FIG. 8(A) is the view showing an inclination of an inner wall of a raised up wall portion, and FIG. 8(B) is the view showing an inclination of the inner wall, that is positioned at a trailing side with respect to the normal rotation direction;

FIGS. 9(A) and 9(B) are views of a separate member which is usable as a substitute for the raised up wall portion of FIG. 8(A), in which FIG. 9(A) is a perspective view of the separate member, and FIG. 9(B) is a sectional view taken along the line IXB-IXB of FIG. 9(A);

DETAILED DESCRIPTION OF THE EMBODIMENTS

In the following, five embodiments 100, 200, 300, 400 and 500 of the present invention will be described in detail with reference to the accompanying drawings.

For ease of description, various directional terms, such as, right, left, upper, lower, rightward and the like are used in the following description. However, such terms are to be understood with respect to a drawing or drawings on which corresponding part or portion is shown.

First Embodiment

Referring to FIGS. 1 to 5(B), there is shown a differential 100 which is a first embodiment of the present invention.

Differential 100 is a device for wheeled motor vehicles, which transmits a driving force of a propeller shaft to drive road wheels of the vehicle. The propeller shaft is driven by a transmission to which a driving force of a prime mover, such as, engine, electric motor or the like is applied.

Figure 1:
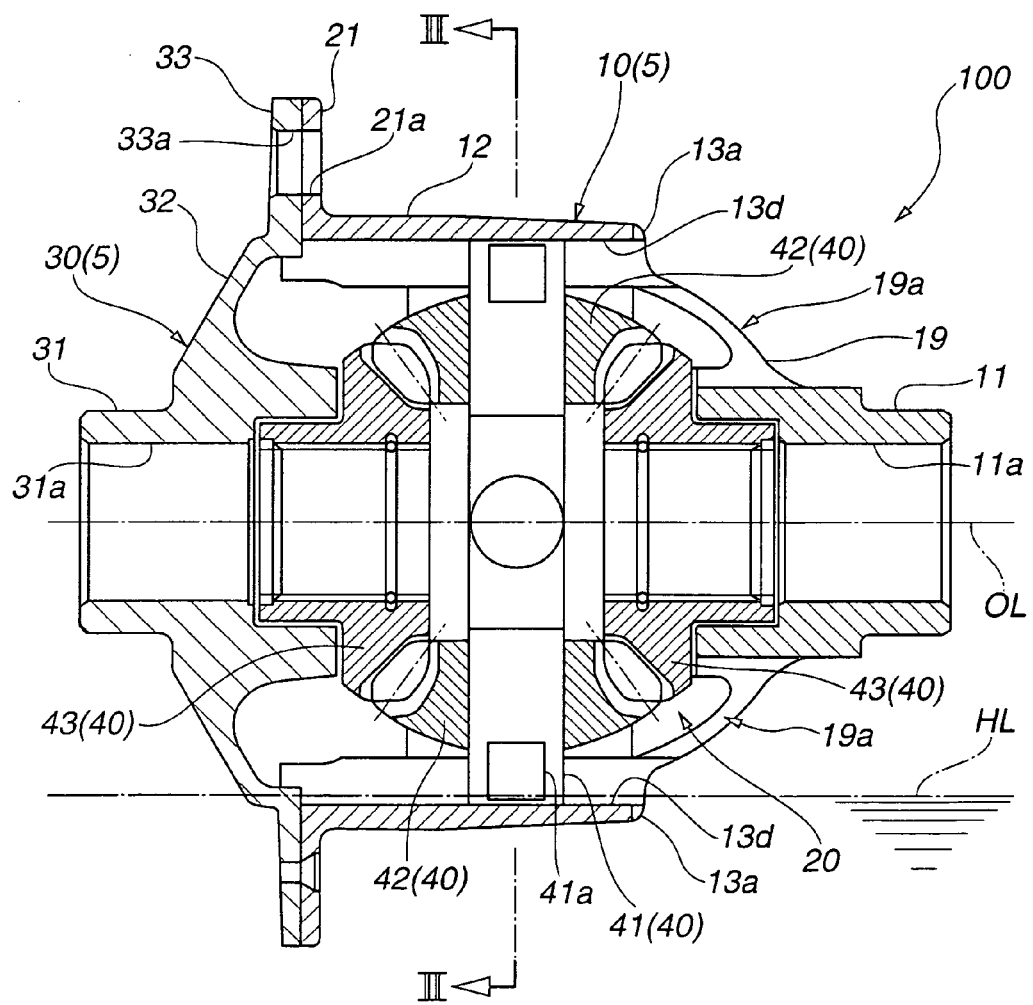
FIG. 1 is a sectional view of a differential which is a first embodiment of the present invention.
Figure 2:
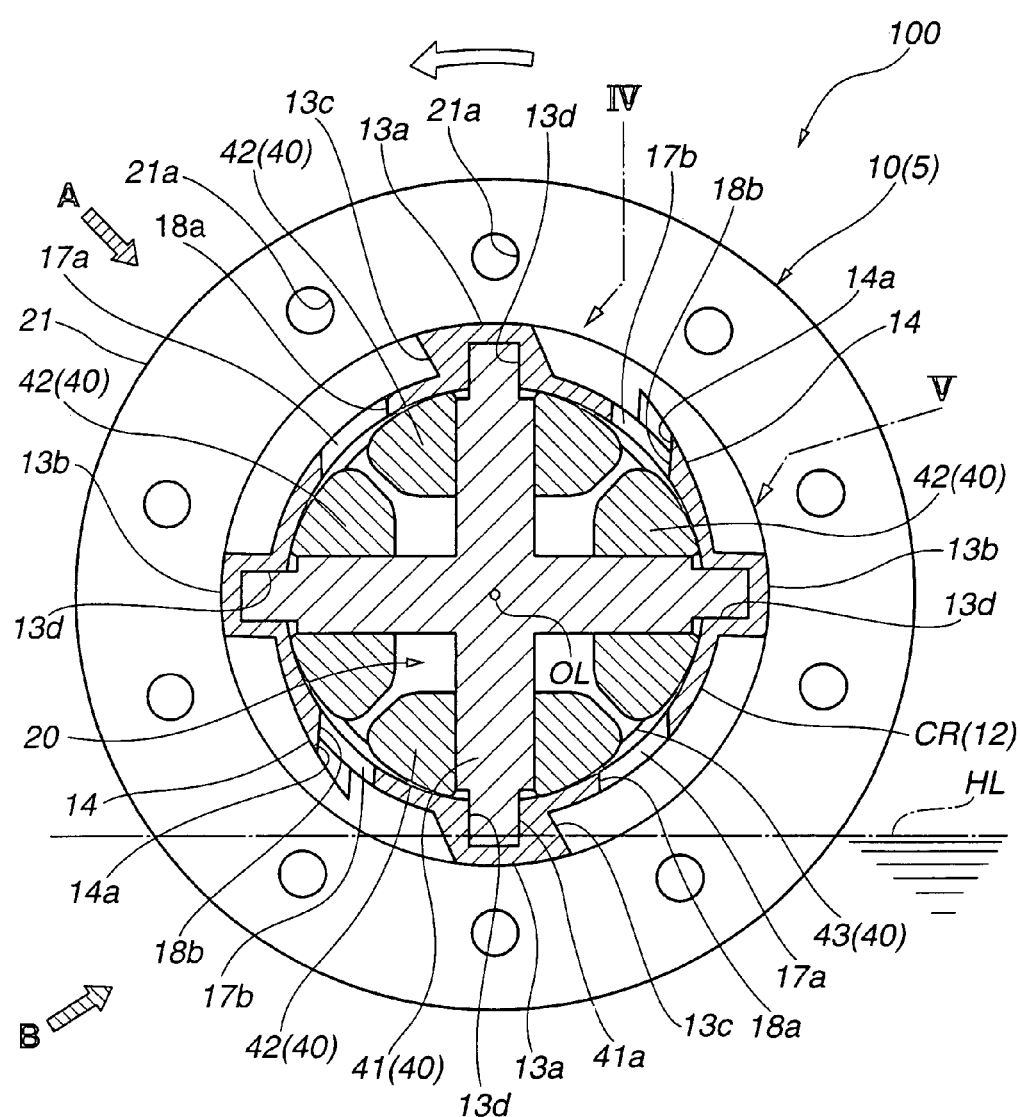
FIG. 2 is a sectional view taken along the line II-II of FIG. 1.

As is seen from FIGS. 1 and 2, differential 100 comprises a differential case 5 that includes a first case half 10 and a second case half 30. Within differential case 5, there is installed a differential gear unit 40 that includes four rotatable pinion gears 42 and two rotatable side gears 43.

As is understood from FIG. 1, differential 100 is rotatably installed in a carrier case (not shown) in such a manner that a lower portion of differential case 5 is immersed in a lubricating oil in an oil pan of the carrier case. The oil level of the lubricating oil in the pan is denoted by HL. That is, differential 100 is rotatable about a rotation axis OL in normal and reverse directions.

It is to be noted that rotation of differential 100 in the normal direction induces a forward movement of an associated motor vehicle. The normal direction is indicated by arrows in FIGS. 2 to 8, 10 and 11.

For reducing the weight, differential case 5 of differential 100 is produced through a forging technique, and for ease of assembling, differential case 5 has a split (or two-piece) construction that includes the first and second case halves 10 and 30.

As is seen from FIG. 1, first case half 10 comprises an annular journal portion 11, a larger diameter portion 12 that has a diameter larger than that of annular journal portion 11, and an intermediate conical portion 19 that extends between annular journal portion 11 and larger diameter portion 12. Larger diameter portion 12 is formed at its left end with an annular flange 21 that extends radially outward. Annular flange 21 is formed with a plurality (viz., ten in the illustrated first embodiment) of bolt openings 21a that are equally spaced from one another.

Second case half 30 comprises an annular journal portion 31, a larger diameter flange portion 33 that has a diameter larger than that of the annular journal portion 31, and an intermediate conical portion 32 that extends between annular journal portion 31 and larger diameter flange portion 33. Flange portion 33 is formed with a plurality (viz., ten in the first embodiment) of bolt openings 33a that are mated with the bolt openings 21a of annular-flange 21 of first case half 10. Although not shown in FIG. 1, a plurality (viz., ten) of bolts and nuts are passed through the mated bolt openings 21a and 33a for tightly joining first and second case halves 10 and 30 together.

As is understood from FIG. 1, annular journal portion 11 of first case half 10 is rotatably supported by a transmission case through a bearing, and has a through bore 11a in which one end of a drive shaft for a road wheel is received. As shown, a center axis of the through bore 11a coincides with the rotation axis OL of differential case 5.

Like the above, annular journal portion 31 is rotatably supported by the transmission case through a bearing, and has a through bore 31a in which one end of another drive shaft is received. As shown, a center axis of the through bore 31a coincides with the rotation axis OL of differential case 5.

As is seen from FIGS. 1 and 2, first case half 10 is formed with a hemispherical bore 20 that is merged with both the interior of intermediate conical portion 19 and that of larger diameter portion 12. Hemispherical bore 20 is concentric with the rotation axis OL. As is seen from FIG. 2, within hemispherical bore 20, there is installed differential gear unit 40 which comprises four pinion gears 42 rotatably held by pinion shafts of a pinion shaft unit 41, and two side gears 43.

As is seen from FIGS. 1 and 2, hemispherical bore 20 is formed at its upper, lower, right and left side inner surface portions with respective (viz., four) grooves 13d which extend in parallel with the rotation axis OL. These grooves 13d respectively receive the pinion shafts of the pinion shaft unit 41.

As is described hereinabove, differential case 5 is of a split (or two-piece) construction. This means that each of grooves 13d has a left end (as viewed in FIG. 1) exposed to the outside and has a right end exposed to the outside through a working bore 19a formed in a part of intermediate conical portion 19.

Due to presence of such working bores 19a, each of grooves 13d has both ends exposed to the outside, and thus, machining (or broaching) of such grooves 13d is easily and precisely carried out. Furthermore, for the same reason, lightening of first case half 10 is achieved.

As is seen from FIGS. 2 and 3, due to provision of the four grooves 13d and the thinner wall construction of differential case due to usage of forging technique, four projected portions 13a and 13b are inevitably produced on an outer surface CR of larger diameter portion 12 of first case half 10, each extending along the rotation axis OL. As is understood from FIG. 2, these four projected portions 13a and 13b are equally spaced from one another, that is, angularly spaced by 90 degrees.

As is best seen from FIGS. 3(A) and 3(B), larger diameter portion 12 of first case half 10 is provided with four (viz., two first and two second) circular openings 17a and 17b each being positioned between mutually adjacent projected portions 13a and 13b.

As is seen from FIG. 2, each opening 17a or 17b is exposed to the gear receiving hemispherical bore 20. As shown, the two projected portions 13a and 13a are positioned at diametrically opposed portions of larger diameter portion 12, and the other two projected portions 13b and 13b are positioned at diametrically opposed portions of the portion 12. In other words, four projected portions 13a, 13b, 13a and 13b are alternatively arranged around rotation axis OL at evenly spaced intervals, that is, at every 90 degrees.

As is seen from FIGS. 3(A) and 3(B), each first circular opening 17a is positioned at a leading side of first projected portion 13a with respect to a normal rotation direction of first case half 10 (viz., differential case 5), and each second circular opening 17b is positioned at a leading side of second projected portion 13b with respect to the normal rotation direction of first case half 10.

The normal rotation direction is a direction in which differential 100 rotates when an associated motor vehicle moves forward.

It is to be noted that differential case 5 is constructed to be usable for various types of differential. That is, in case wherein a higher torque transmission is required, a cross-shaped pinion shaft unit 41 having four pinion gears 42 is used. In this case, the four pinion shafts are received respectively in the four grooves 13d of the first and second projected portions 13a and 13b, as is shown in FIG. 2. While, in case wherein a lower torque transmission is required, a rod-shaped pinion shaft having two pinion gears is used. In this case, the two pinion shafts are received respectively in grooves 13d of the diametrically opposed first projected portions 13a. As is seen from FIG. 2, first projected portions 13a are constructed thicker than second projected portions 13b.

Figure 4A:
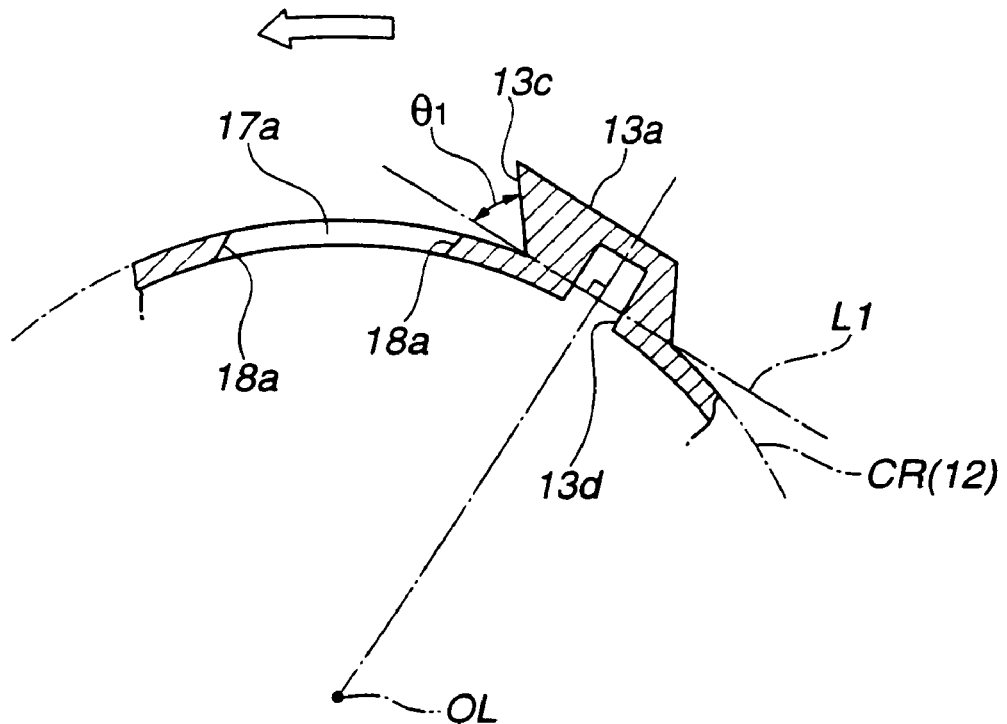

As is seen from FIG. 4(A), an inclined surface 13c of each first projected portion 13a, that is positioned at a leading side of the portion 13a with respect to the normal rotation direction, defines an acute angle relative to the outer surface CR of differential case 5.

More specifically, as is seen from the drawings, the leading inclined surface 13c of each first projected portion 13a defines an acute angle θ1 (viz., an angle smaller than 90 degrees) relative to a tangential line L1 of the outer surface CR at a center point of the first projected portion 13a. As shown, preferably, an inclined surface of each first projected portion 13a, that is positioned at a trailing side of the portion 13a with respect to the normal rotation direction, defines an obtuse angle (viz., an angle greater than 90 degrees) θ3 relative to the outer surface CR of differential case 5. However, in the present invention, the angle of the trailing inclined surface is not limited to such obtuse angle.

Figure 4B:
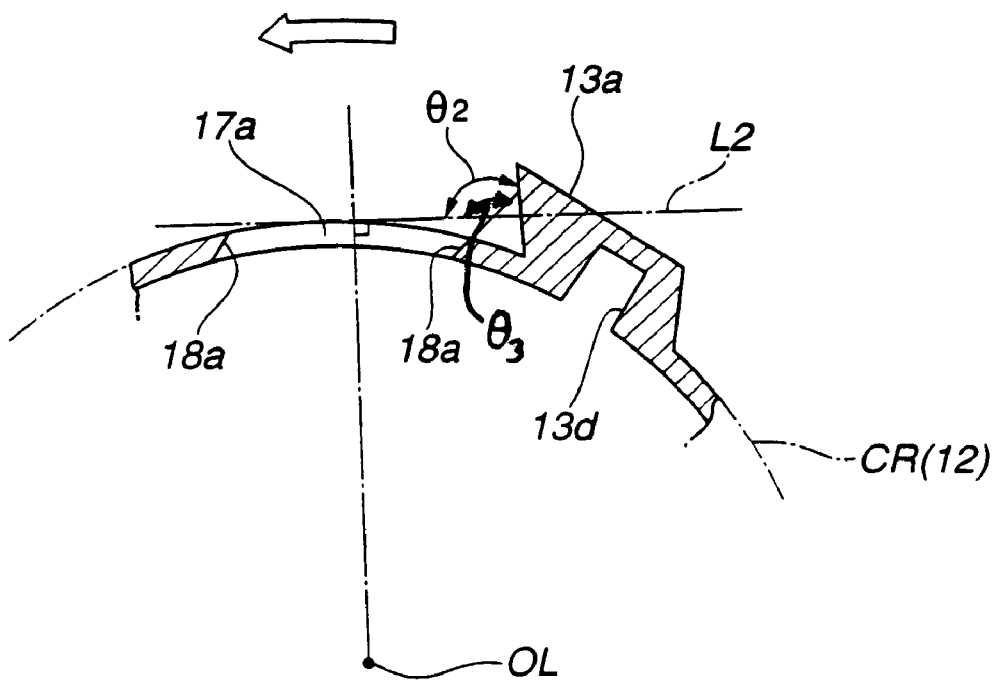

As is seen from FIG. 4(B), each first circular opening 17a has therethroughout an inclined peripheral edge surface 18a which defines an obtuse angle relative to the outer surface CR of differential case 5.

More specifically, as is seen from the drawings, the inclined peripheral edge surface 18a of each first circular opening 17a defines an obtuse angle θ3 (viz., an angle greater than 90 degrees) relative to a tangential line L2 of the outer surface CR at a center point of the first circular opening 17a.

In the illustrated embodiment, the inclined surface 18a with the obtuse angle θ3 is evenly made throughout the entire periphery of the first circular opening 17a. However, if desired, such inclined surface 18a may be provided at only a portion that is near the first projected portion 13a. That is, the inclined surface that is far from the first projected portion 13a may have an angle smaller than 90 degrees.

As is seen from FIG. 2, at a leading side of one first circular opening 17a, there is provided one second projected portion 13d, and at a leading side of another first circular opening 17a, there is provided another second projected portion 13d. At a leading side of each second projected portion 13d, there are provided a thicker wall portion 14 and second circular opening 17b.

Figure 5A:
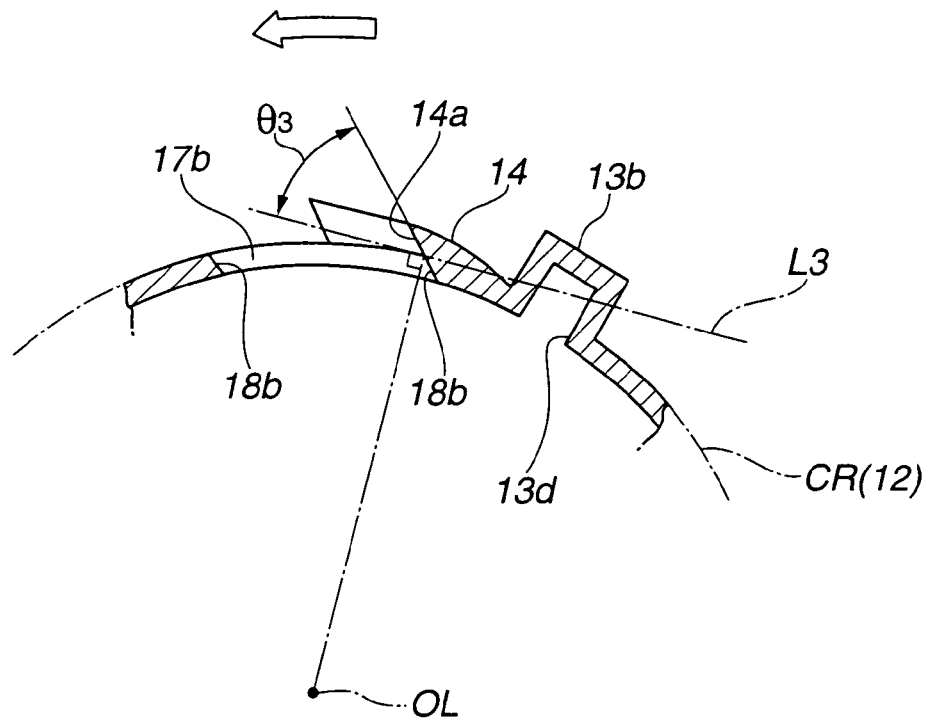

As is seen from FIG. 5(A), each thicker wall portion 14 is positioned between each second projected portion 13b and second circular opening 17b that is positioned at a leading side of the second projected portion 13b with respect to the normal rotation direction. As shown, the thicker wall portion 14 is raised up from a base part of the leading side of the second projected portion 13b. As shown, the thicker wall portion 14 is thicker than a peripheral part of the leading side of the second circular opening 17b. A stepped surface 14a that constitutes a leading end of thicker wall portion 14 and is formed on a peripheral edge of the second circular opening 17b is inclined toward the normal rotation direction. That is, stepped surface 14a defines an acute angle relative to the outer surface CR of differential case 5.

More specifically, as is shown in FIG. 5(A), the leading stepped surface 14a of thicker wall portion 14 defines an acute angle (viz., an angle smaller than 90 degrees) relative to a tangential line L3 of the outer surface CR at the stepped surface 14a. If desired, in place of providing such thicker wall portion 14, a distance between the rotation axis OL and a trailing part of the second circular opening 17b may be greater than that between the rotation axis OL and a leading part of the second circular opening 17b. With this measure, there is provided a stepped surface between the training part of the opening 17b and the leading part of the same.

Figure 5B:
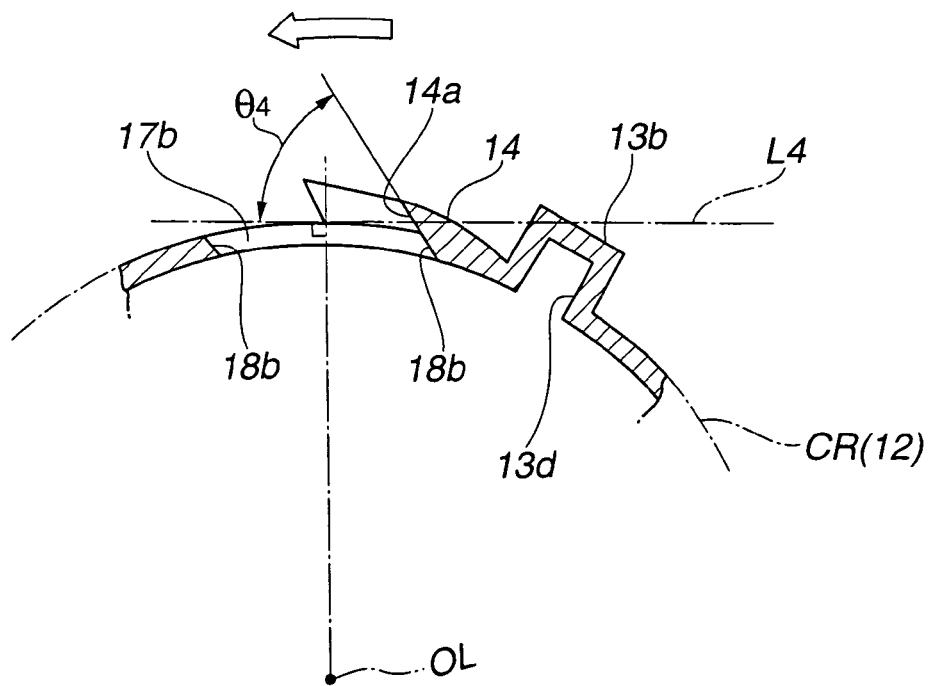

As is seen from FIG. 5(B), an inner wall surface 18b of the second circular opening 17b that is positioned near the leading side of the thicker wall portion 14 is shaped inclined in a direction from a radially inside part of the opening 17b to a radially outside part of the same.

More specifically, as is understood from the drawing, the inner wall surface 18b of second circular opening 17b defines an acute angle θ4 (viz., an angle smaller than 90 degrees) relative to a tangential line L4 of the outer surface CR at a center point of second circular opening 17b. In the illustrated first embodiment, the inclined inner wall surface 18b is evenly made throughout the entire periphery of the second circular opening 17b. However, if desired, such inclined surface 18b with the acute angle θ4 may be provided at only a portion that is near a trailing portion of the second circular opening 17b. That is, the inclined inner wall surface 18b that constitutes a leading part of second circular opening 17b may have an angle lager than 90 degrees.

The shape of both sides of each second projected portion 13b is not limited in the present invention. However, in view of lightening of differential 100, it is preferable that the inclination angle of each side of the projected portion 13b relative to a tangential line at a center point of the portion 13b is an obtuse angle.

As is described hereinabove, two first projected portions 13a, two second projected portions 13b, two first circular openings 17a, two second circular openings 17b and two thicker wall portions 14 are provided on or in the cylindrical outer surface CR of larger diameter portion 12 of first case half 10.

That is, as is seen from FIG. 2, first circular opening 17a, second projected portion 13b, thicker wall portion 14, second circular opening 17b, another first projected portion 13a, another first circular opening 17a, another second projected portion 13b, another thicker wall portion 14 and another second circular opening 17b appear in a counterclockwise direction. However, in the invention, the order of such portions and openings is not limited. That is, in case wherein four first projected portions 13a are provided, the order may be first projected portion 13a, first circular opening 17a, first projected portion 13a, first circular opening 17a, first projected portion 13a, first circular opening 17a, first projected portion 13a and first circular opening 17a. And, in case wherein four second projected portions 13b are provided, the order may be second projected portion 13b, thicker wall portion 14, second circular opening 17b, second projected portion 13b, thicker wall portion 14, second circular opening 17b, second projected portion 13b, thicker wall portion 14, second circular opening 17b, second projected portion 13b, thicker wall portion 14 and second circular opening 17b.

As has been mentioned hereinabove, and as is seen from FIGS. 1 and 2, differential gear unit 40 of differential 100 comprises cross-shaped pinion shaft unit 41, four pinion gears 42 rotatably held by the four shafts of the unit 41 and two side gears 43 meshed with the pinion gears 42.

As is seen from FIGS. 1 and 2, the leading end of each shaft of the pinion shaft unit 41 is formed with parallel side surfaces 41a which are mated with side walls of the corresponding groove 13d of first or second projected portion 13a or 13b. Each pinion gear 42 is rotatably disposed on the corresponding shaft at a portion inside the parallel side surfaces 41a.

For assembling differential 100, the following steps are employed, which will be explained with the aid of FIG. 1.

First, one side gear 43, that is to be positioned at right side of differential 100, is inserted into hemispherical bore 20 of larger diameter portion 12 of first case half 10 from a left-positioned opening of larger diameter portion 12, and then the side gear 43 is positioned to be concentric with the rotation axis OL of differential 100 or differential case 5.

Then, the cross-shaped pinion shaft unit 41 with the four pinion gears 42 is inserted into the interior of larger diameter portion 12 from the left-positioned opening of the portion 12 in such a manner that the leading ends of the four shafts are mated with the corresponding grooves 13d of the larger diameter portion 12. In this case, as is seen from FIG. 2, the center axis of pinion shaft unit 41 coincides with the rotation axis OL and the four pinion gears 42 are meshed with the previously set side gear 43.

Then, another side gear 43 is inserted into the interior of the larger diameter portion 12 from the left-positioned opening of the portion 12 and meshed with the previously set four pinion gears 42.

Then, second case half 30 is tightly connected to first case half 10 by means of bolts and nuts (not shown), each bolt being received in an alighted bolt opening including openings 21a and 33a of flanges 21 and 33.

In the following, operation will be described with reference to the drawings, especially FIG. 2.

In FIG. 2, denoted by reference "HL" is the oil level of lubricating oil in the oil pan.

When, as is seen from FIG. 2, under forward movement of an associated motor vehicle, differential 100 is rotated about the rotation axis OL in a normal direction, that is, in the direction indicated by an arrow, each of first projected portions 13a comes into the oil level HL causing inclined surface 13c of the leading side thereof to dip up the lubricating oil. The lubricating oil thus dipped up by each first projected portion 13a is rushed into the interior of differential case 5 from first circular opening 17a of the leading side. Thus, the parts of differential gear unit 40 are lubricated with the oil.

It is to be noted that because of the thinner wall construction of differential case 5, first circular openings 17a fail to reach the oil level HL. However, as is described hereinabove, in the first embodiment 100 of the present invention, provision of first projected portions 13a forces the lubricating oil to be led into the interior of differential case 5 through first circular openings 17a. That is, even when the thickness of first case half 10 is small, lubrication of the rotational parts in the case half 10 is assuredly carried out. In other words, in the first embodiment 100, both lightening of differential 100 and adequate lubrication of the same are achieved.

Since inclined surface 13c of the leading side of each first projected portion 13a defines an acute angle relative to the outer surface CR of differential case 5, the first projected portion 13a is able to have an effective oil dipping-up function.

Furthermore, since, as is seen from FIG. 2, the peripheral edge surface 18a of each first circular opening 17a defines an obtuse angle relative to the outer surface CR of differential case 5, introduction of the lubricating oil into the interior of differential case 5 is easily carried out. That is, the peripheral edge surface 18a is inclined in such a manner as to facilitate introduction of the lubricating oil into the interior of differential case 5.

As is understood from FIG. 2, under rotation of differential 100 in the normal direction, each of the thicker wall portions 14 comes into the oil level HL causing the stepped surface 14a of the leading side thereof to dip up the lubricating oil. The lubricating oil thus dipped up by each thicker wall portion 14 is rushed into the interior of differential case from second circular opening 17b of the leading side. Thus, lubrication of the parts of differential gear unit 40 is much assuredly carried out.

It is to be noted that because of the thinner wall construction of differential case 5, second circular openings 17b fail to reach the oil level HL. However, as has been mentioned hereinabove, in the first embodiment of the present invention, provision of thicker wall portions 14 forces the lubricating oil to be led into the interior of differential case 5 through second circular openings 17b. That is, even when the thickness of first case half 10 is small, lubrication of the rotational parts in the case half 10 is assuredly carried out. In other words, in the first embodiment, both lightening of differential 100 and adequate lubrication of the same are achieved.

Since stepped surface 14a of the leading side of each thicker wall portion 14 defines an acute angle relative to the outer surface CR of differential case 5, the thicker wall portion 14 is able to have an effective oil dipping-up function.

Furthermore, since, as is seen from FIG. 2, the peripheral edge surface 18b of each second circular opening 17b defines an obtuse angle relative to the outer surface CR of differential case 5, introduction of the lubricating oil into the interior of differential case 5 is easily carried out. That is, the peripheral edge surface 18b is inclined in such a manner as to facilitate introduction of the lubricating oil into the interior of differential case 5.

As is described hereinabove, in the first embodiment of the present invention, two first projected portions 13a and two thicker wall portions 14 function to feed the interior of differential case with the lubricating oil.

Second Embodiment

Referring to FIGS. 6 to 9(B), there is shown a differential 200 which is a second embodiment of the present invention.

Since differential 200 of the second embodiment is similar to differential 100 of the above-mentioned first embodiment, the following description on the second embodiment 200 will be mainly directed to only parts and portions which are different from those of the first embodiment 100. Similar parts and portions to those of the first embodiment 100 are denoted by the same numerals.

Figure 6:
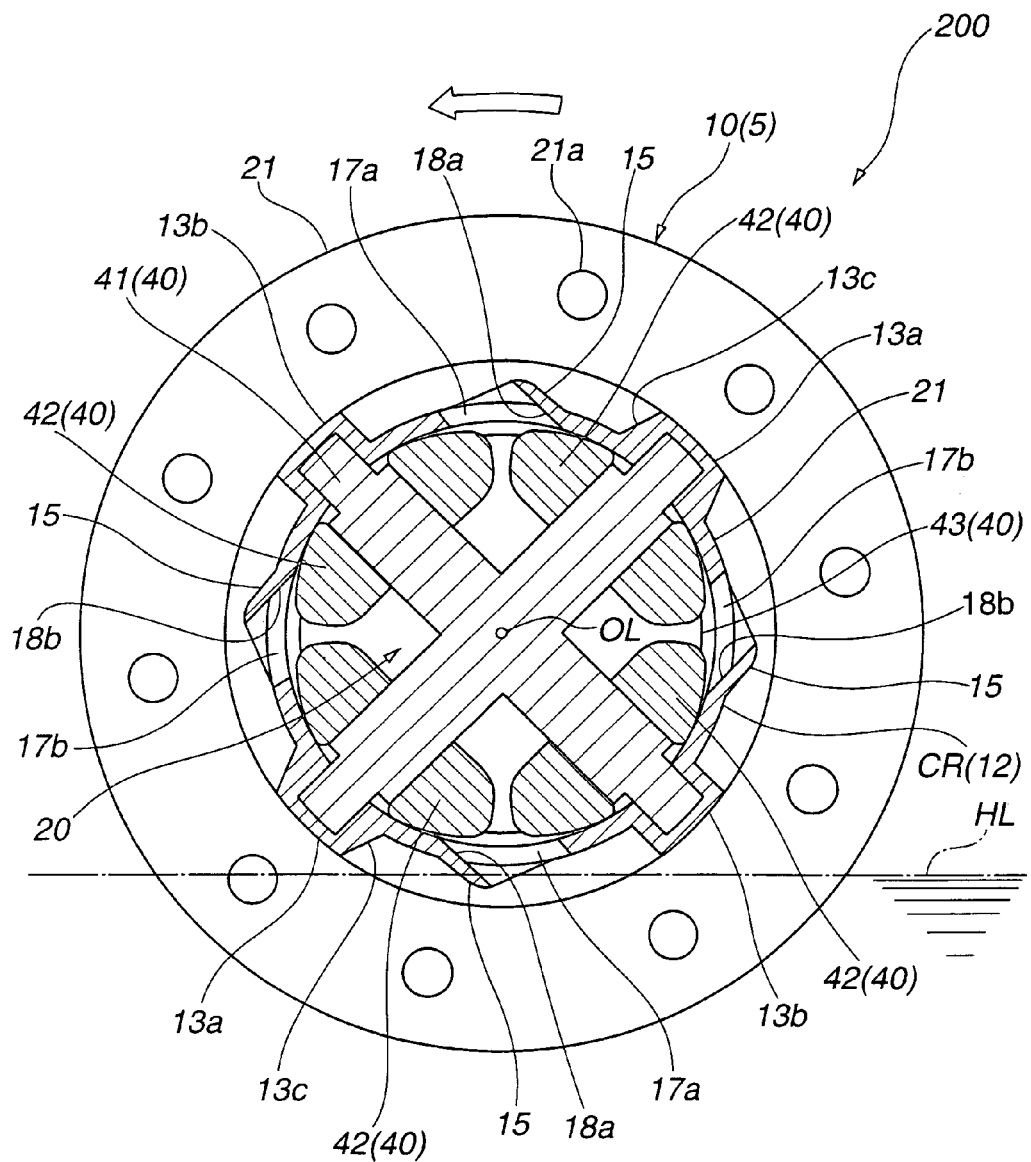
FIG. 6 is a view similar to FIG. 2, but showing a differential which is a second embodiment of the present invention.
Figure 7:
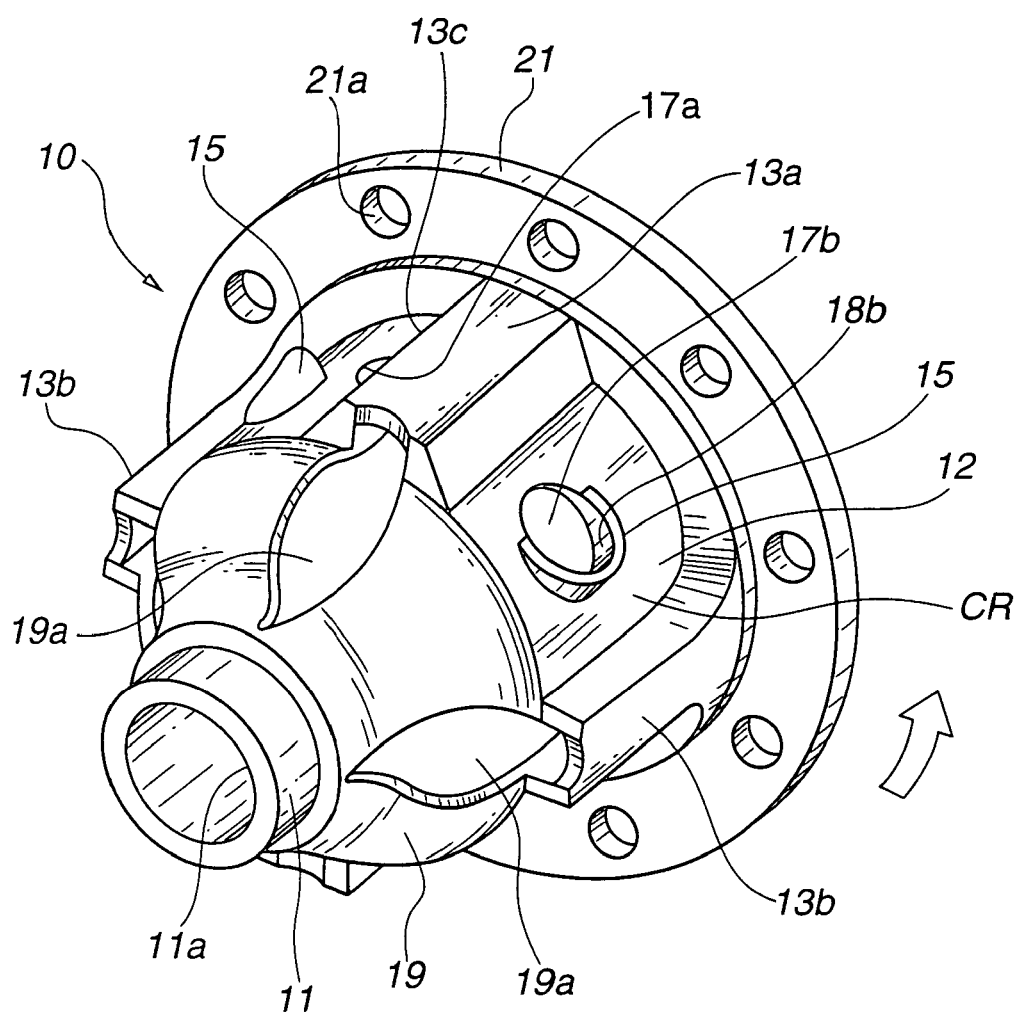
FIG. 7 is a perspective view of a half of the differential of the second embodiment of the present invention.

As is seen from FIGS. 6 and 7, in differential 200 of the second embodiment, an inclined surface 13c of each of first projected portions 13a, that is positioned at a leading side of the portion 13a with respect to the normal rotation direction, defines an obtuse angle (not acute angle) relative to the outer surface CR of differential case 5.

Furthermore, in the second embodiment 200, in place of the two thicker wall portions 14 of the first embodiment 100, four raised up wall portions 15 are provided. That is, as is seen from FIGS. 6 and 7, from a trailing peripheral end of each first circular opening 17a, there extends a raised up wall portion 15, and from a trailing side of each second circular opening 17b, there extends a raised up wall portion 15. That is, these four raised up wall portions 15 are each shaped to open toward the normal rotation direction.

Like the first embodiment 100, differential case 5 comprises first case half 10 and second case half 30 which are connected by means of bolts and nuts. Within differential case 5, there is operatively installed differential gear unit 40 which comprises cross-shaped pinion shaft unit 41, four pinion gears 42 rotatably held by pinion shaft unit 41 and two side gears 43 meshed with pinion gears 42.

As is seen from FIG. 6, on the outer surface CR of larger diameter portion 12 of first case half 10, there are integrally formed two diametrically opposed first projected portions 13a and two diametrically opposed second projected portions 13b. As is described hereinabove, the inclined surface 13c of each first projected portion 13a, that is positioned at the leading side of the portion 13a defines an obtuse angle (viz., an angle greater than 90 degrees).

As is seen from FIG. 7, four raised up wall portions 15 are integrally formed on the outer surface CR of larger diameter portion 12 of first case half 10, each being positioned at the trailing side of the corresponding first or second circular opening 17a or 17b.

Figure 8A:
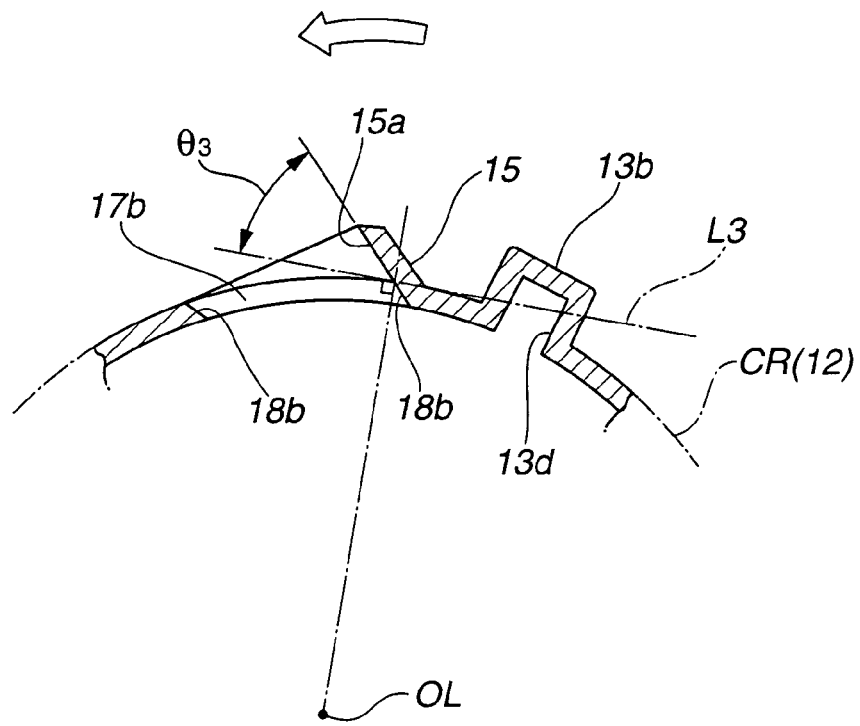

As is seen from FIG. 8(A), raised up wall portion 15 has an inclined surface 15a that faces the normal rotation direction and defines an acute angle relative to the outer surface CR of differential case 5.

More specifically, as is seen from the drawing, the inclined surface 15a of each raised up wall portion 15, that is positioned at the trailing side of the second (or first) circular opening 17b (or 17a), defines an acute angle θ3 (viz., an angle smaller than 90 degrees) relative to a tangential line L3 of the outer surface CR at the trailing side.

Figure 8B:
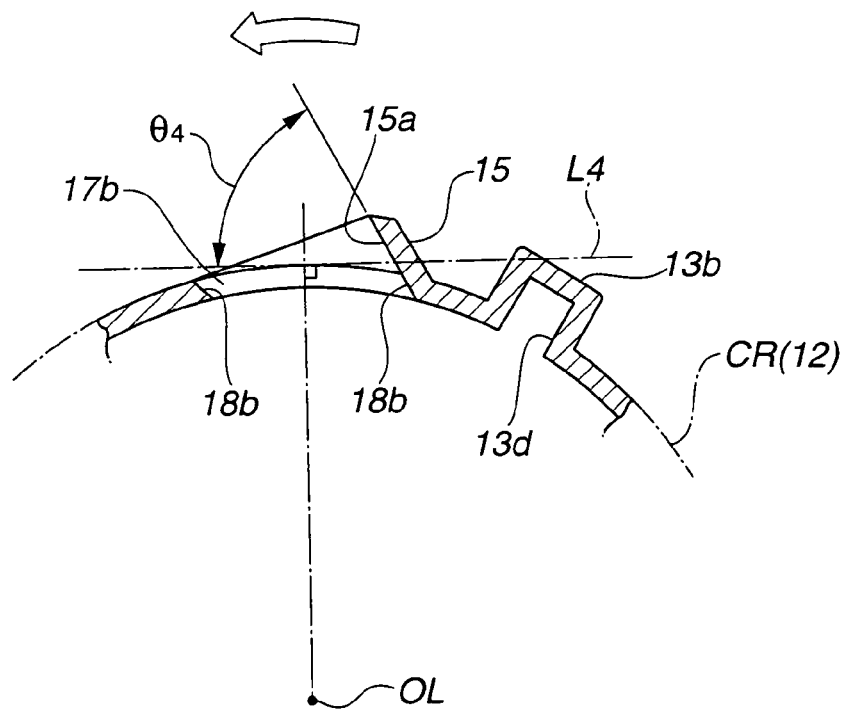

As is seen from FIG. 8(B), each second circular opening 17b has therethroughout an inclined peripheral edge surface 18b which defines an acute angle relative to the outer surface CR of differential case 5.

More specifically, as is seen from the drawing, the inclined peripheral edge surface 18b of each second circular opening 17b defines an acute angle θ4 (viz., an angle smaller than 90 degrees) relative to a tangential line L4 of the outer surface CR at a center point of the second circular opening 17b.

It is to be noted that raised up wall portions 15 provided at the trailing side of first circular openings 17a have the same shape as those of the portions 15 for second circular openings 17b.

In the illustrated embodiment, the inclined surface 18a or 18b with an acute angle θ4 is evenly made throughout the entire periphery of the first or second circular opening 17a or 17b. However, if desired, such inclined surface 18a or 18b may be provided at only a portion that is near first or second projected portion 13a or 13b.

Four raised up wall portions 15 may be integral with first case half 10 or separate members that are welded to the case half 10.

Figure 9A:
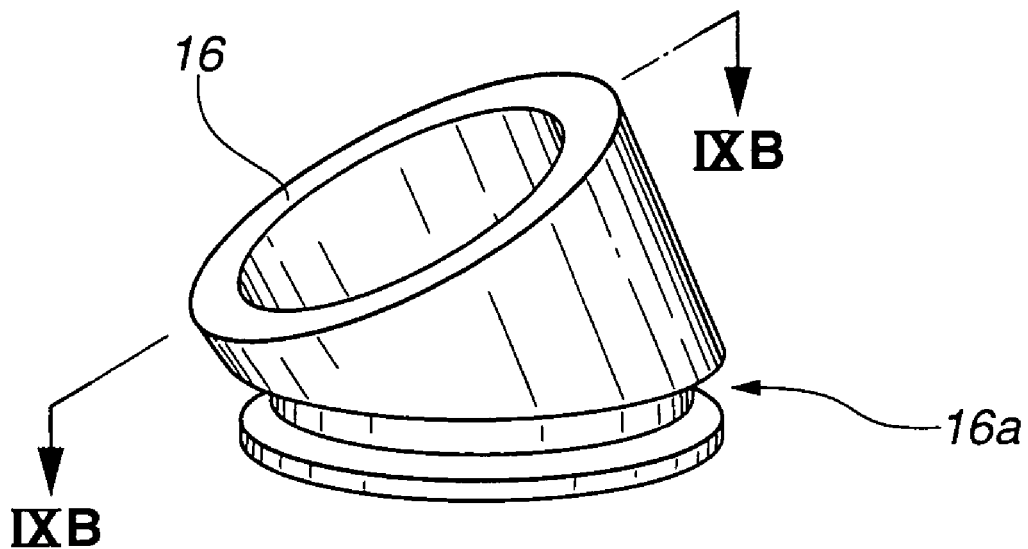
Figure 9B:
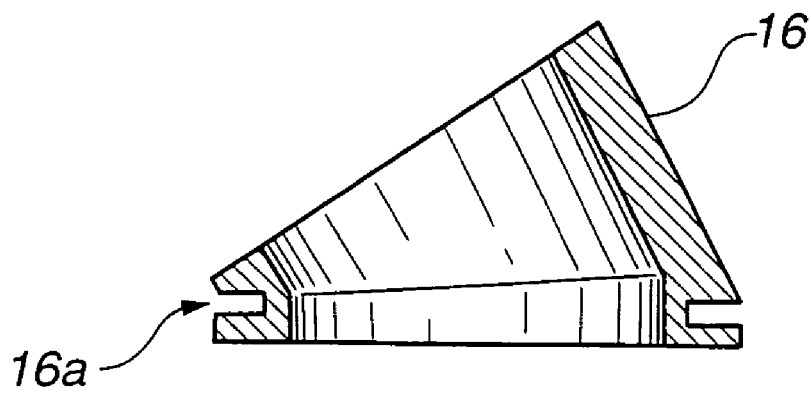

Referring to FIGS. 9(A) and 9(B), there is shown a separate member 16 constructed of a plastic material. The member 16 is usable as a substitute for the raised up wall portion 15 and comprises a cylindrical portion and a base portion. The base portion is formed with a circular groove 16a. In practical use, the member 16 is connected to first or second circular opening 17a or 17b having the peripheral edge of the opening 17a or 17b received in circular groove 16a. Of course, in this case, the cylindrical portion should be directed toward the normal rotation direction.

In the illustrated second embodiment 200, four raised up wall portions 15 are provided for the first and second circular openings 17a and 17b. However, if desired, such raised up wall portions 15 may be provided for only the two second circular openings 17b, the two first projected portions 13a may have each the leading surface 13c that defines an acute angle relative to the outer surface CR of differential case 5, and the inclined peripheral end surface 18a of each first circular opening 17a may define an obtuse angle θ2 relative to the outer surface CR.

In the following, operation will be described with reference to the drawings, especially FIG. 6.

When, as is seen from FIG. 6, under forward movement of an associated motor vehicle, differential 200 is rotated about the rotation axis OL in a normal direction, that is, in the direction indicated by an arrow, each of the raised up wall portions 15 comes into the oil level HL and dips up the lubricating oil. The lubricating oil thus dipped up by each raised up wall portion 15 is rushed into the interior of differential case 5 from first or second circular opening 17a or 17b of the leading side. Thus, the parts of differential gear unit 40 are lubricated with the oil.

It is to be noted that because of the thinner wall construction of differential case 5, first and second circular openings 17a and 17b fail to reach the oil level HL. However, as is described hereinabove, in the second embodiment 200 of the present invention, provision of the raised up wall portions 15 forces the lubricating oil to enter the interior of differential case 5 through first and second circular openings 17a and 17b. Thus, also in this second embodiment 200, both lightening of differential 200 and adequate lubrication of the same are achieved.

Since inclined peripheral edge surface 18a or 18b of each raised up wall portion 15 provided at the trailing side of first or second circular opening 17a or 17b defines an acute angle relative to the outer surface CR of differential case 5, each raised up wall portion 15 is able to have an effective oil dipping-up function.

Third Embodiment

Figure 10:
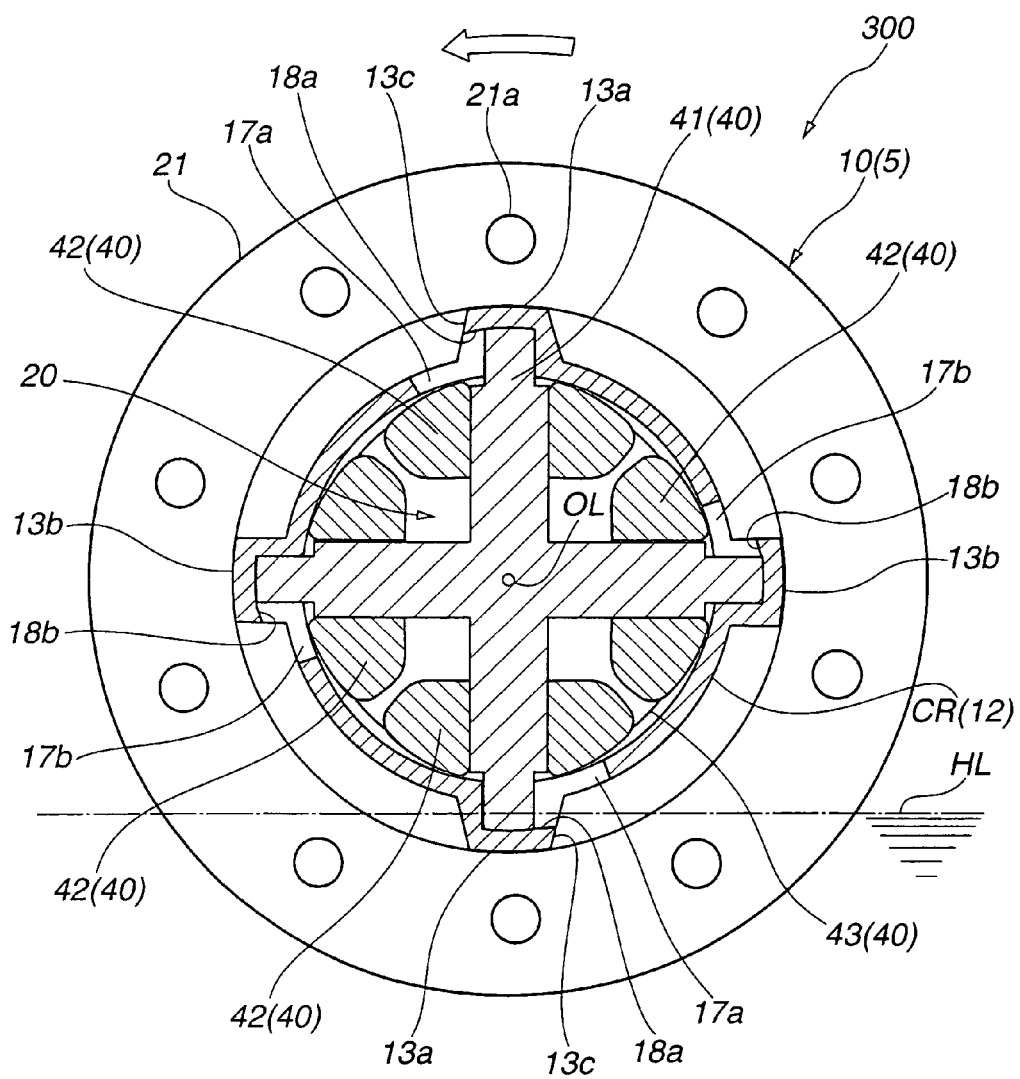
FIG. 10 is a view similar to FIG. 2, but showing a differential which is a third embodiment of the present invention.
Figure 11:
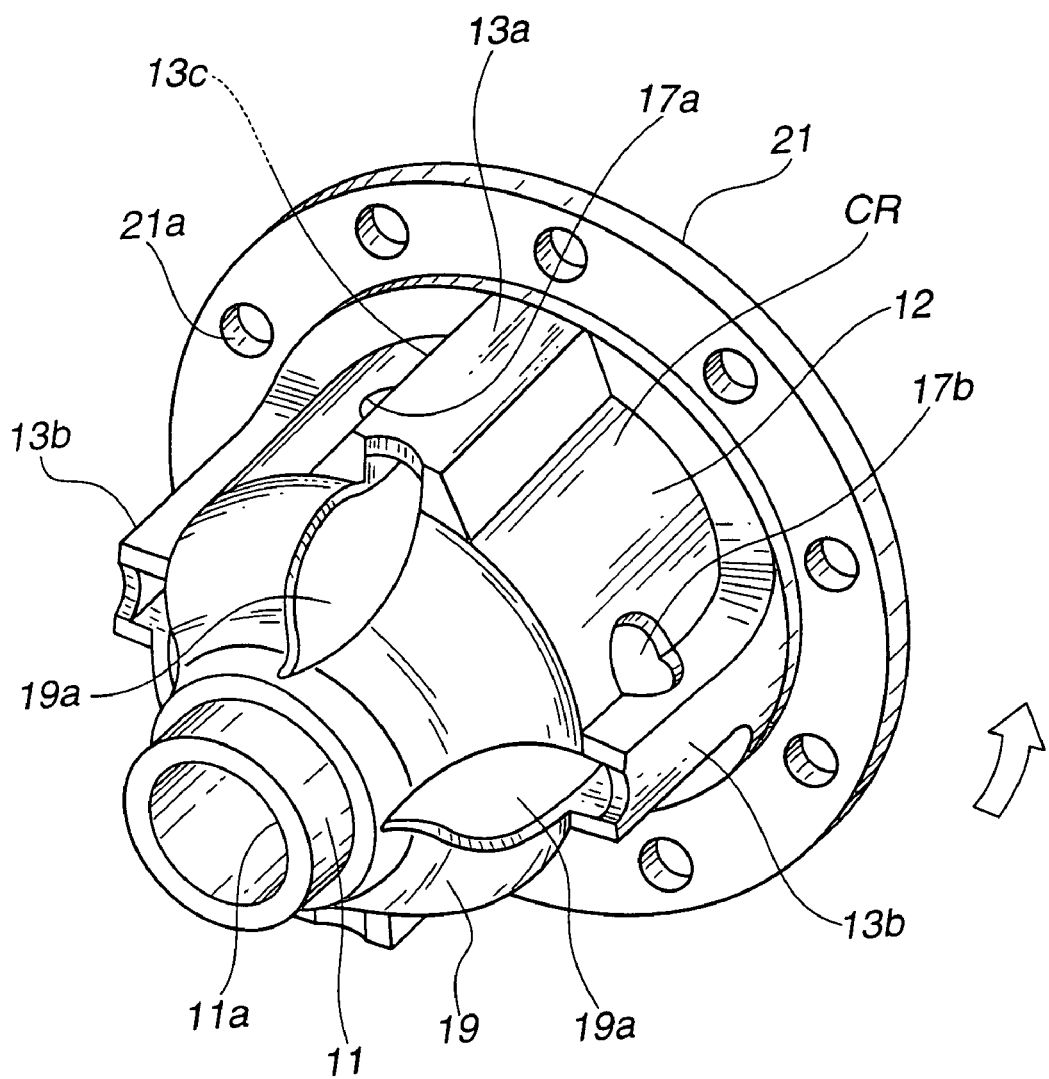
FIG. 11 is a perspective view of a half of the differential of the third embodiment.

Referring to FIGS. 10 and 11, there is shown a differential 300 which is a third embodiment of the present invention.

Since differential 300 of the third embodiment is similar to differential 100 of the first embodiment, the following description on the third embodiment 300 will be mainly directed to only parts and portions which are different from those of the first embodiment 100. Similar parts and portions to those of the first embodiment 100 are denoted by the same numerals.

As is seen from FIG. 10, in differential 300 of the third embodiment, each first circular opening 17a has a trailing part that is defined in a leading side wall 13c of the corresponding first projected portion 13a, and each second circular opening 17b has trailing part that is defined in a leading portion of the corresponding second projected portion 13b.

Like the first embodiment 100, differential case 5 comprises first case half 10 and second case half 30 which are connected by means of bolts and nuts. Within differential case 5, there is operatively installed differential gear unit 40 which comprises cross-shaped pinion shaft unit 41, four pinion gears 42 rotatably held by pinion shaft unit 41 and two side gears 43 meshed with pinion gears 42.

As is seen from FIG. 10, on the outer surface CR of larger diameter portion 12 of first case half 10, there are integrally formed two diametrically opposed first projected portions 13a and two diametrically opposed second projected portions 13b.

As shown, the leading side wall 13c of each first projected portion 13a where the trailing part of first circular opening 17a is formed defines an obtuse angle relative to the outer surface CR of larger diameter portion 12 of first case half 10.

If desired, each of the first and second circular openings 17a and 17b may be entirely formed in the leading side wall of the first or second projected portion 13a or 13b.

Furthermore, if desired, each of the two first circular openings 17a may have a trailing part that is defined in the leading side wall of the corresponding first projected portion 13a and each of the second circular openings 17b may be provided between the first and second projected portions 13a and 13b. In this case, a thicker wall portion (14) is provided between second circular opening 17b and second projected portion 13b, or a raised up wall portion (15) is provided at a trailing side of the second circular opening 17b.

In the following, operation will be described with reference to the drawings, especially FIG. 10.

When, as is seen from FIG. 10, under forward movement of an associated motor vehicle, differential 300 is rotated about the rotation axis OL in a normal direction, that is, in the direction indicated by an arrow, each of first and second projected portions 13a and 13b comes into the oil level HL leading the lubricating oil into the interior of differential case 5 through first or second circular opening 17a or 17b. Thus, the parts of differential gear unit 40 are lubricated with the oil.

Thus, also in this third embodiment 300, both lightening of differential 300 and adequate lubrication of the same are achieved.

Fourth Embodiment

Referring to FIGS. 12 to 18, there is shown a differential 400 which is a fourth embodiment of the present invention.

As will become apparent as the description proceeds, differential 400 of the fourth embodiment has an improvement in guiding the lubricating oil toward the two side gears 43 in the interior of differential case 5.

Figure 12:
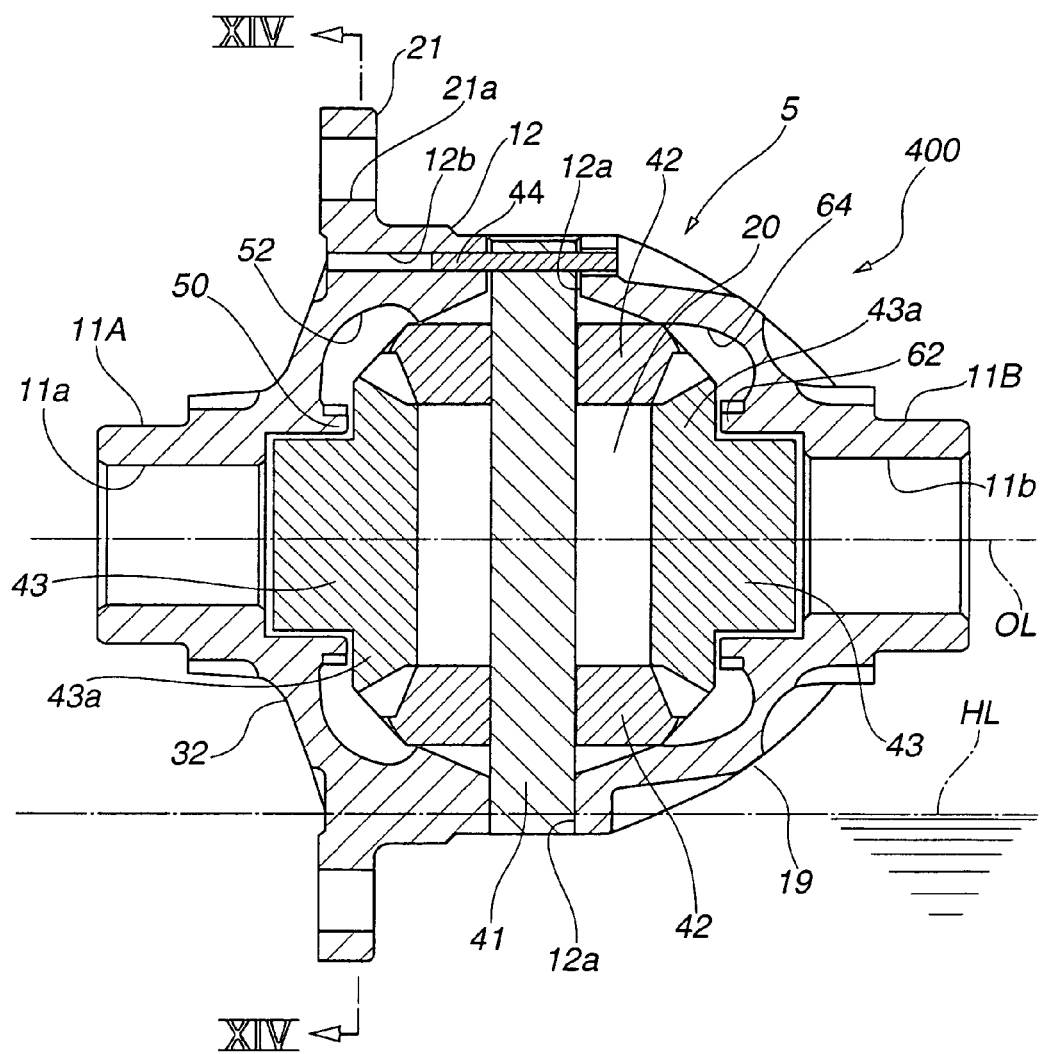
FIG. 12 is a sectional view of a differential which is fourth embodiment of the present invention.

As is seen from FIG. 12, differential 400 of this embodiment comprises a differential case 5 in which a differential gear unit 40 is operatively installed. In this embodiment 400, differential case 5 is of a so-called one-piece construction. Differential gear unit 40 comprises two side gears 43, a rod-shaped pinion shaft 41 and two pinion gears 42 which are rotatably supported by the pinion shaft 41.

As is understood from FIG. 12, differential 400 is rotatably installed in a carrier case (not shown) in such a manner that a lower portion of differential case 5 is immersed in a lubricating oil in an oil pan of the carrier case. The oil level of the lubricating oil in the pan is dented by HL. That is, differential 400 is rotatable about a rotation axis OL in normal and reverse directions.

It is to be noted that rotation of differential 100 in the normal direction induces a forward movement of an associated motor vehicle. The normal direction is indicated by arrows in FIGS. 13, 14, 16, 17 and 18.

For reducing the weight, differential case 5 of differential 400 is produced through a forging technique.

As is seen from FIG. 12, differential case 5 is of a one-piece type comprising a left annular journal portion 11A, a right annular journal portion 11B and a larger diameter portion 12 that is positioned between left and right annular journal portions 11A and 11B and has a diameter larger than that of the journal portions 11A and 11B.

Although now shown in the drawings, larger diameter portion 12 is formed with circular openings such as first and second circular openings 17a and 17b of the above-mentioned first embodiment 100.

As shown, between left annular journal portion 11A and larger diameter portion 12, there is integrally formed a first conical portion 32, and between right annular journal portion 11B and larger diameter portion 12, there is integrally formed a second conical portion 19.

At a left end of larger diameter portion 12, there is integrally formed an annular flange 21 which is formed with a plurality (viz., ten in the illustrated fourth embodiment) of bolt openings 21a that are equally spaced from one another. Although not shown in the drawing, annular flange 21 is fixed to a differential ring gear (not shown) with the aid of bolts and nuts associated with bolt openings 21a.

As is understood from FIG. 1, left journal portion 11A of differential case 5 is rotatably supported by a transmission case through a bearing, and has a through bore 11a in which an inside end of a drive shaft for a left road wheel is received. As shown, a center axis of the through bore 11a coincides with the rotation axis OL of differential case 5.

Like the above, right journal portion 11B of differential case is rotatably supported by the transmission case through a bearing, and has a through bore 11b in which an inside end of a drive shaft for a right road wheel is received. Also, a center axis of the through bore 11b coincides with the rotation axis OL.

In differential case 5, there is formed a generally spherical bore 20 that is defined by first conical portion 32, larger diameter portion 12 and second conical portion 19. Spherical bore 20 has a longitudinal axis in coincidence with the rotation axis OL.

Larger diameter portion 12 is formed at its diametrically opposed upper and lower portions with respective bores 12a for receiving therein opposed ends of the rod-shaped pinion shaft 41.

As shown in the drawing, differential case 5 is formed with a pin receiving hole 12b that extends rightward from a left end of the case 5 in parallel with the rotation axis OL.

As shown, a pin 44 in pin receiving hole 12b passes through a slot of pinion shaft 41 thereby to fixing pinion shaft 41 to differential case 5. Two pinion gears 42 are rotatably disposed on opposed portions of the rod-shaped pinion shaft 41, and two side gears 43 are each meshed with the two pinion gears 42, as shown.

As shown in FIG. 12, first conical portion 32 is formed with an annular bearing projection 50 which bears an annular boss portion 43a of left side gear 43.

It is to be noted that bearing ridge 50 is projected inward or rightward in the drawing for compensating the thinner wall construction of differential case 5. With this arrangement, only an inward end of bearing ridge 50 contacts a back side of annular boss portion 43a of left side gear 43, and thus an inner surface 52 of the spherical bore 20 defined by first conical portion 32 is spaced from the back side of annular boss portion 43a.

Figure 13:
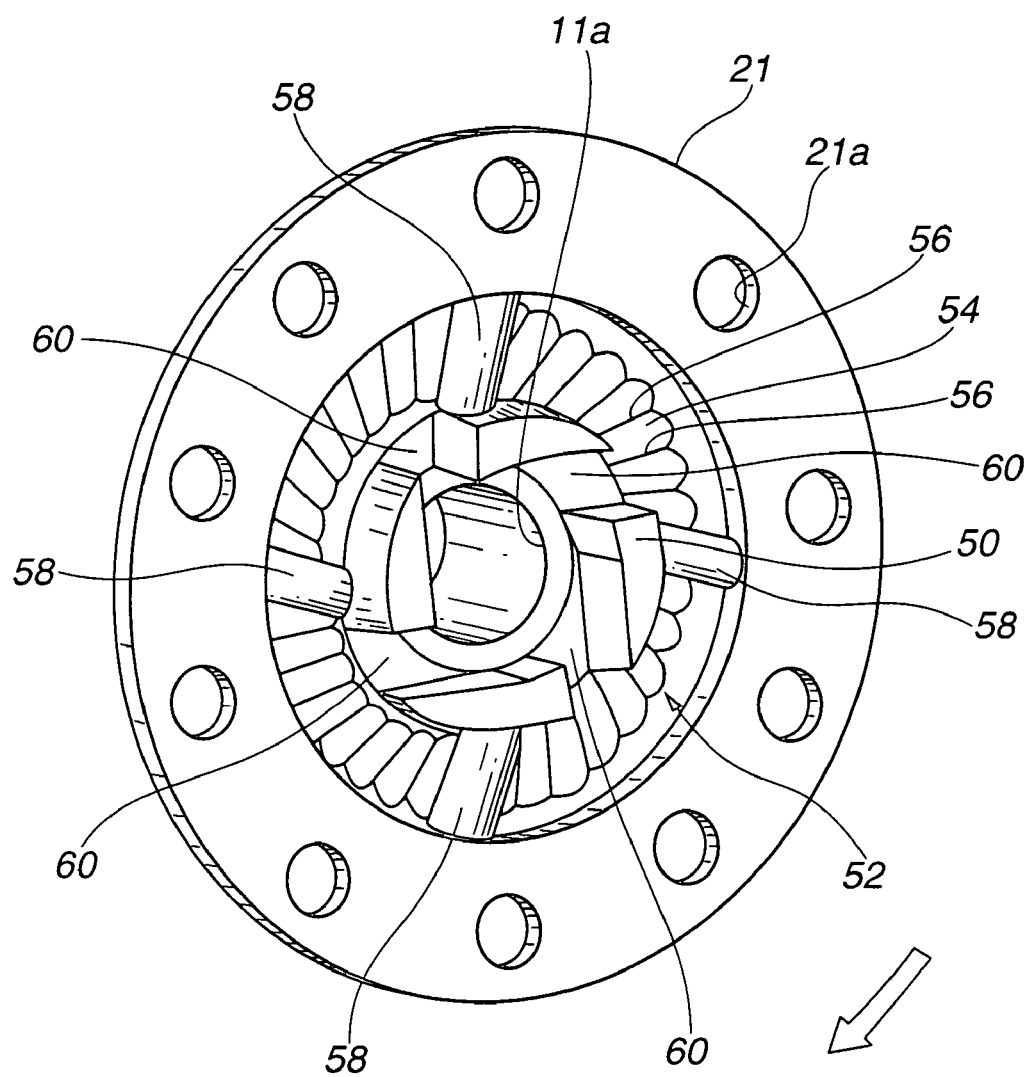
FIG. 13 is a perspective view of an inner wall of a first conical portion of differential case of the fourth embodiment.
Figure 14:
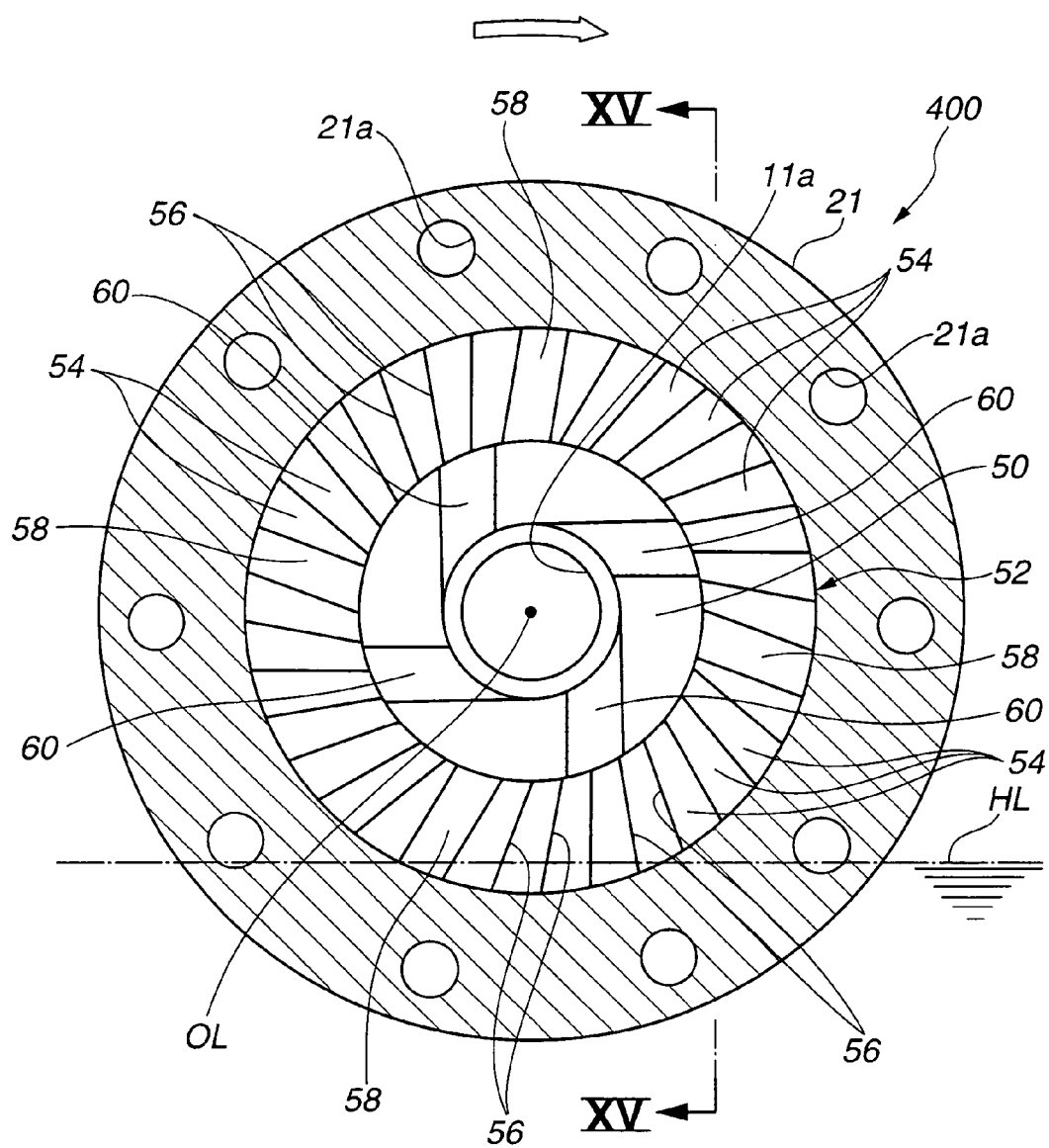
FIG. 14 is a sectional view taken along the line XIV-XIV of FIG. 12 with a side gear removed.
Figure 15:
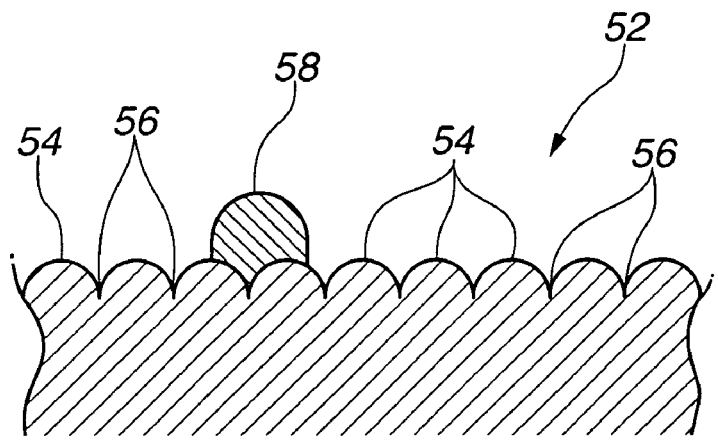
FIG. 15 is an enlarged sectional view taken along the line XV-XV of FIG. 14.

As is seen from FIGS. 13 to 15, particularly FIG. 13, inner surface 52 of spherical bore 20 is corrugated including a plurality of rounded bank portions 54 which are arranged around the rotation axis OL at evenly spaced intervals. Between adjacent bank portions 54, there is thus defined an oil guide groove 56.

Furthermore, inner surface 52 of spherical bore 20 is formed with four raised portions 58, each being larger and higher than the rounded bank portion 54, as is best seen from FIG. 15. These four raised portions 58 are arranged around the rotation axis OL at evenly spaced intervals, that is, at every 90 degrees.

Figure 16:
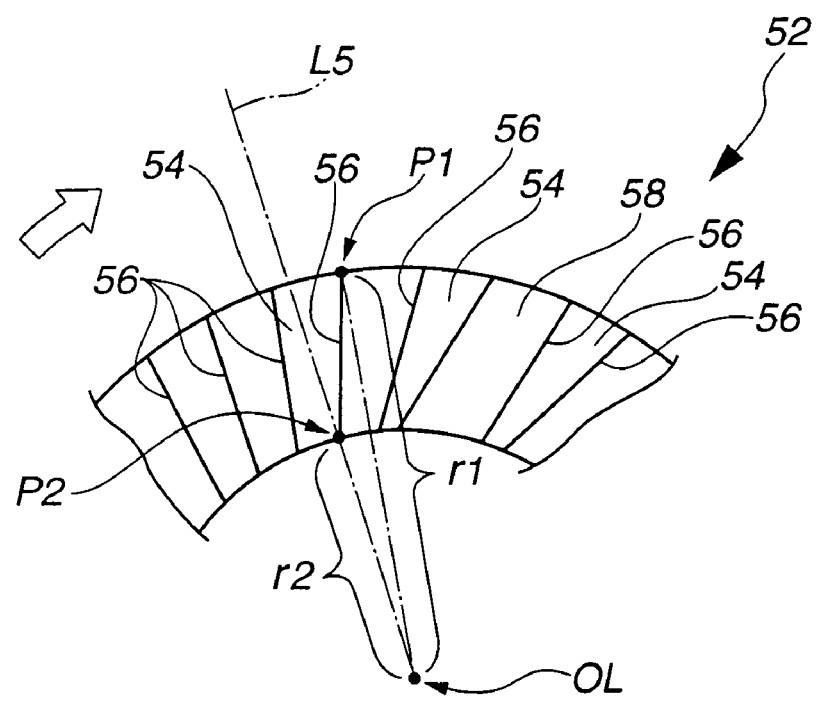
FIG. 16 is a schematic view showing inclination of oil guide grooves with respect to the normal rotation direction.

As is seen from FIG. 16, the oil guide grooves 56 defined by bank portions 54 are arranged about the rotation axis OL while inclining toward the normal rotation direction.

That is, the inclination of each oil guide groove 56 is so made that a distance "r1" between an outer end "P1" of the groove 56 and the rotation axis OL is greater than a distance "r2" between an inner end "P2" of the groove 56 and the rotation axis OL and the outer end "P1" is positioned at a leading side with respect to an imaginary line L5 that passes through the inner end "P2" and the rotation axis OL.

Similar to the above, the four raised portions 58 are inclined toward the normal rotation direction. That is, as is seen from FIG. 17, the inclination of each raised portion 58 is so made that a distance "r3" between an outer end "P3" of the raised portion 58 and the rotation axis OL is greater than a distance "r4" between an inner end "P4" of the raised portion 58 and the rotation axis OL and the outer end "P3" is positioned at a leading side with respect to an imaginary line L6 that passes through the inner end "P4" and the rotation axis OL.

Referring back to FIG. 13, annular bearing projection 50 of the inner surface 52 of spherical bore 20 is formed with four broader guide grooves 60 which are equally spaced from one another. These broader guide grooves 60 are also inclined toward the normal rotation direction. That is, as is seen from FIG. 18, the inclination of each broader guide groove 60 is so made that a distance "r5" between an outer end "P5" of the groove 60 and the rotation axis OL is greater than a distance "r6" between an inner end "P6" of the groove 60 and the rotation axis OL and the outer end "P5" is positioned at a leading side with respect to an imaginary line L7 that passes through the inner end "P6" and the rotation axis OL.

Referring back to FIG. 12, second conical portion 19 is formed with an annular bearing projection 62 which bears an annular boss portion 43a of right side gear 43.

Like the above-mentioned annular bearing projection 50 of first conical portion 32, the bearing ridge 62 is projected inward or leftward in the drawing for compensating the thinner wall construction of differential case 5. That is, only an inward end of bearing ridge 62 contacts a back side of annular boss portion 43a of right side gear 43, and thus an inner surface 64 of the spherical bore 20 defined by second conical portion 19 is spaced from the back side of annular boss portion 43a.

Figure 17:
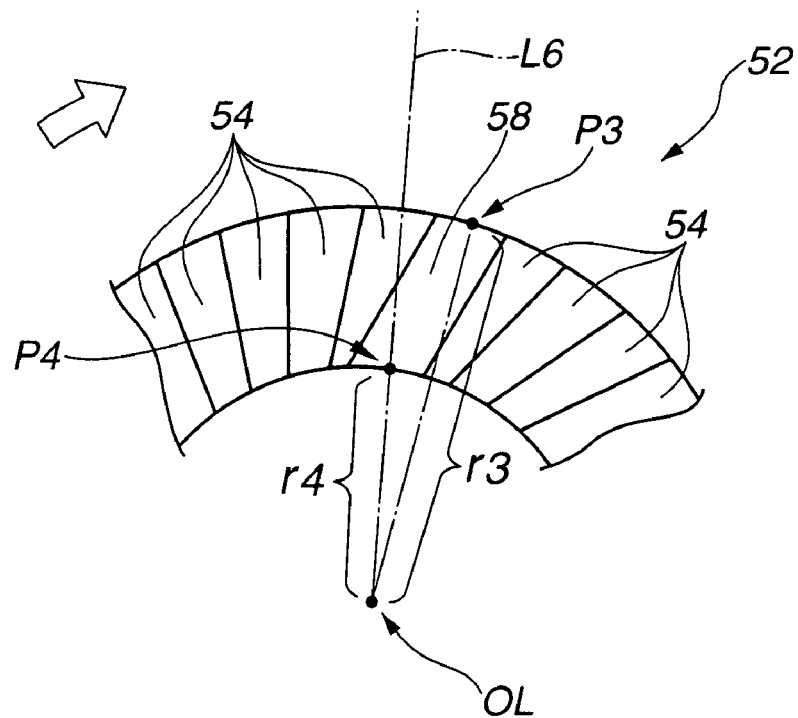
FIG. 17 is a schematic view showing inclination of each of raised portions with respect to the normal rotation direction.
Figure 18:
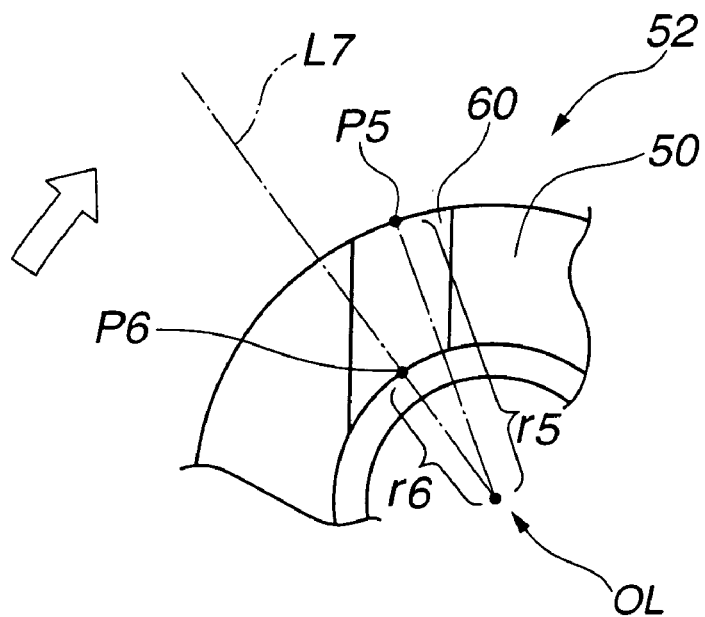
FIG. 18 is a schematic view showing inclination of each of broader guide grooves with respect to the normal rotation direction.

Although not shown in the drawings, the inner surface 64 of second conical portion 19 has substantially the same structure as that of the inner surface 52 of the above-mentioned first conical portion 32. That is, the inner surface 64 is corrugated including a plurality of rounded bank portions (54) which are arranged around the rotation axis OL at evenly spaced intervals. Between adjacent back portions (54), there is defined an oil guide groove (56). The oil guide grooves (56) are inclined toward the normal rotation direction, like the manner as shown in FIG. 16. Furthermore, inner surface 64 is formed with four raised portions (58), each being larger and higher than the rounded bank portion (54). These four raised portions (58) are inclined toward the normal rotation direction, like the manner as shown in FIG. 17. Furthermore, the annular bearing projection 62 is formed with four equally spaced guide grooves which are inclined toward the normal rotation direction like the guide grooves 60 (see FIG. 18) of the annular bearing projection 50 of the first conical portion 32.

In the following, operation will be described with reference to the drawings, especially FIG. 14.

When, as is seen from FIG. 14, under forward movement of an associated motor vehicle, differential 400 is rotated about the rotation axis OL in a normal direction, that is, in the direction indicated by an arrow, rounded bank portions 54 and raised portions 58 formed on inner surface 52 of first conical portion 32 (and also on second conical portion 19) come into the oil level HL dipping up the lubricating oil into their guide grooves 56. Then, as is understood from the drawing, the lubricating oil in the guide grooves 56 is guided toward the rotation axis OL through four guide grooves 60 and finally reach left side gear 43 (and also right side gear 43, see FIG. 12).

As is described hereinabove, the inclination of rounded bank portions 54, four raised portions 58 and four guide grooves 60 toward the normal rotation direction functions to force the lubricating oil to reach the side gears 43.

Furthermore, due to provision of four raised portions 58 that are larger and higher than rounded bank portions 54, the oil dipping effect is much increased.

Thus, also in this fourth embodiment 400, both lightening of differential 400 and adequate lubrication of the same are achieved.

Fifth Embodiment

Referring to FIGS. 19 to 24, there is shown a differential 500 which is a fifth embodiment of the present invention.

Since differential 500 of this fifth embodiment is similar to differential 400 of the above-mentioned fourth embodiment, the following description on the fifth embodiment 500 will be mainly directed to only parts and portions which are different from those of the fourth embodiment 400. Similar parts and portions to those of the fourth embodiment 400 are denoted by the same numerals.

Figure 19:
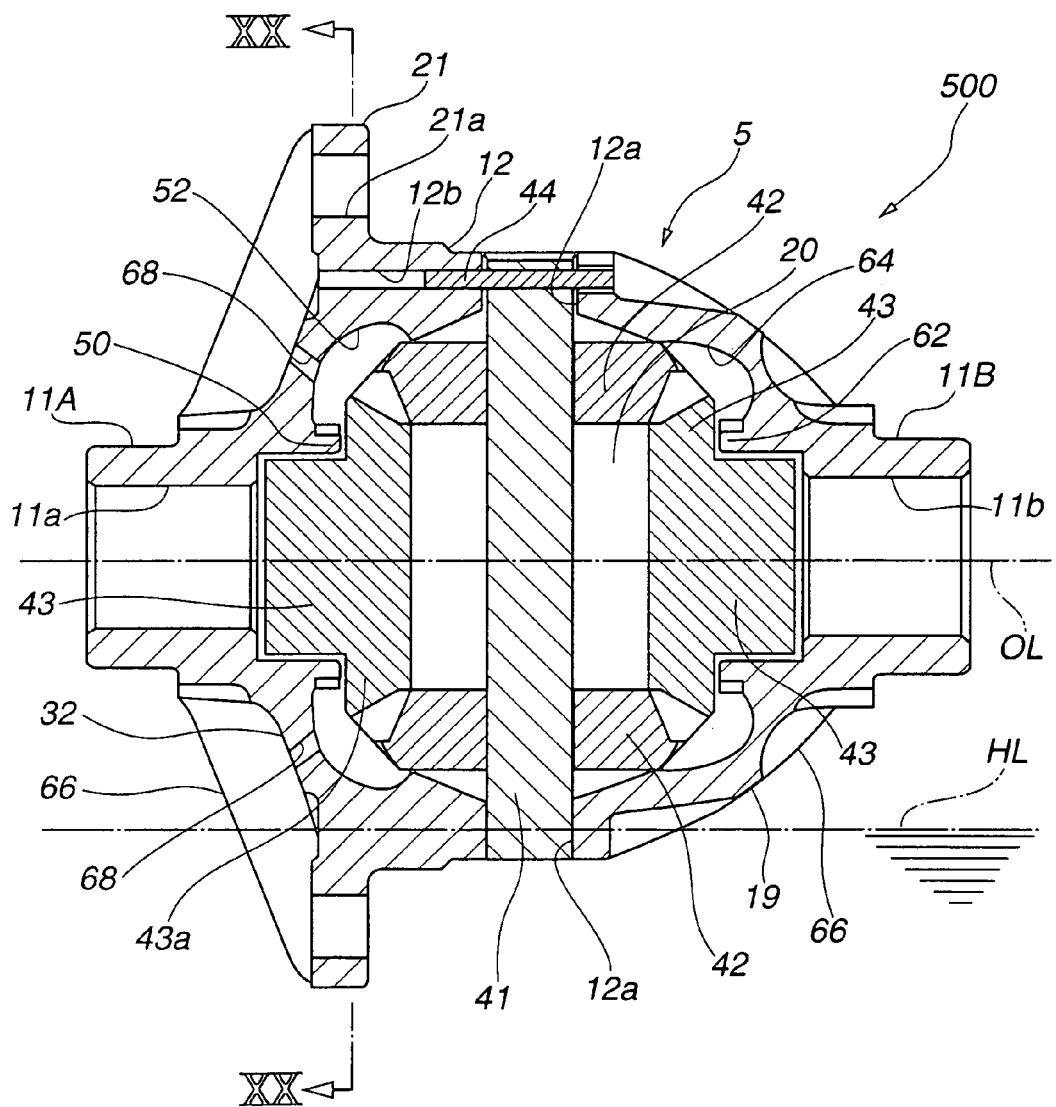
FIG. 19 is a sectional view of a differential which is a fifth embodiment of the present invention.

As is seen from FIG. 19, in differential 500 of the fifth embodiment, ribs 66 are integrally formed on outer walls of first and second conical portions 32 and 19 for reinforcing differential case 5. As is seen from FIG. 21, first conical portion 32 is formed with five ribs 66 that extend radially outward from left annular journal portion 11A. These ribs 66 are arranged at equally spaced intervals as shown.

Figure 20:
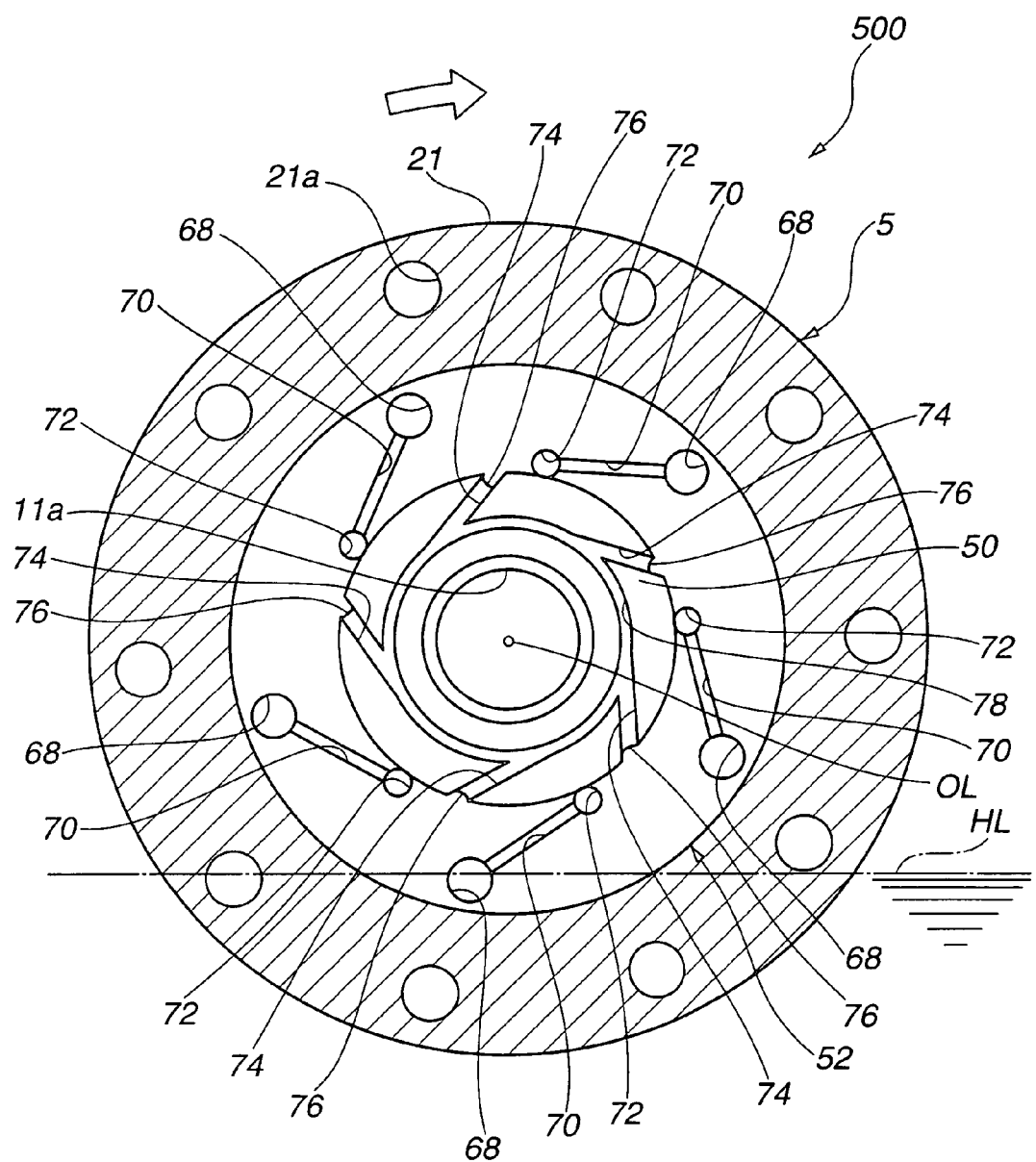
FIG. 20 is a sectional view taken along the line XX-XX of FIG. 19.
Figure 21:
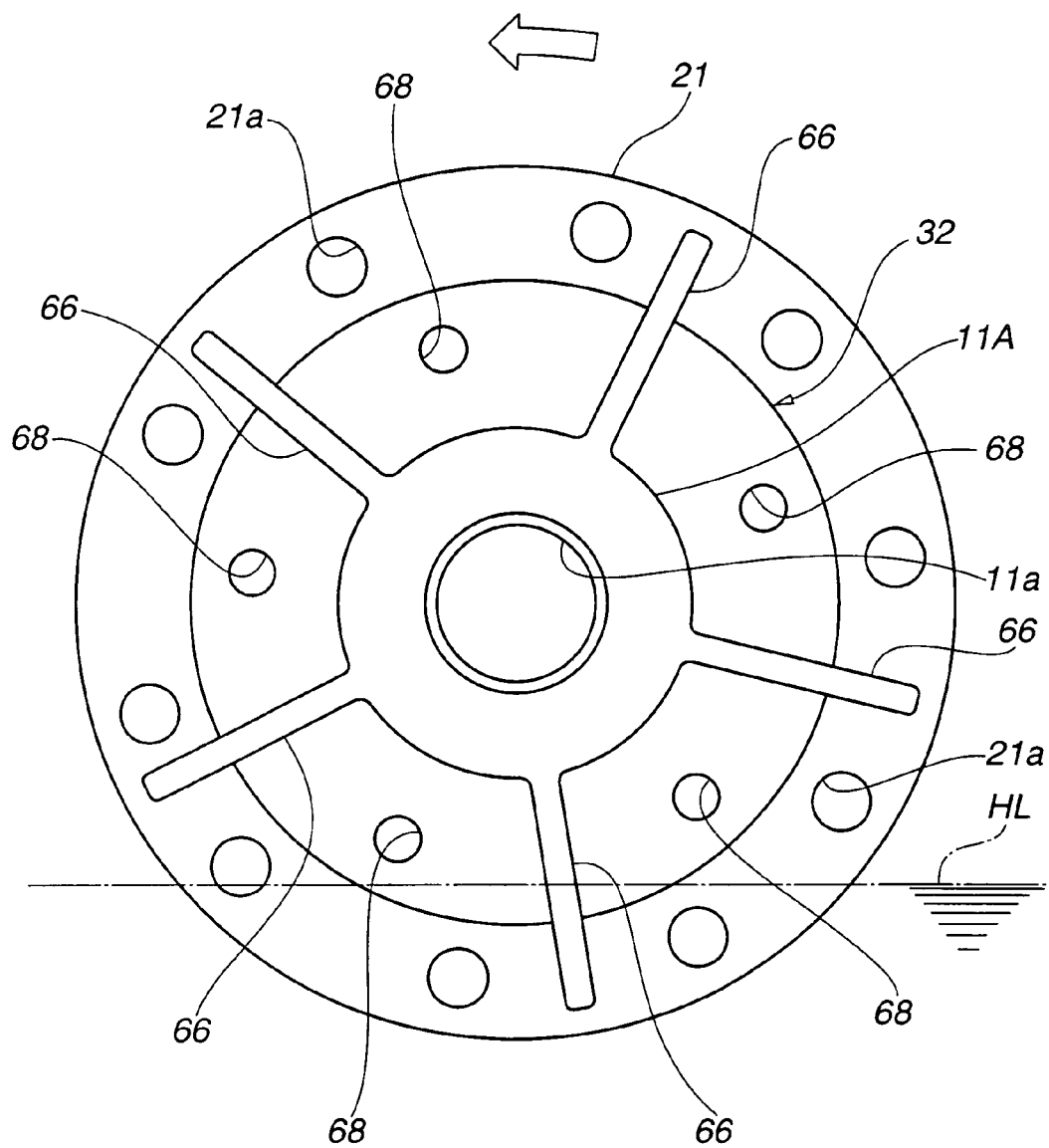
FIG. 21 is a view taken from the left of FIG. 19, showing an exterior view of a first conical portion of differential case.

As is seen from FIGS. 19, 20 and 21, first conical portion 32 is formed with five equally spaced through openings 68, each opening 68 being positioned between adjacent two ribs 66 as shown in FIG. 21.

As is seen from FIG. 21, from each through opening 68, there extends a first guide groove 70 toward a radially inward portion of inner surface 52 of. Each first guide groove 70 has a recessed end 72 near annular bearing projection 50.

Figure 23:
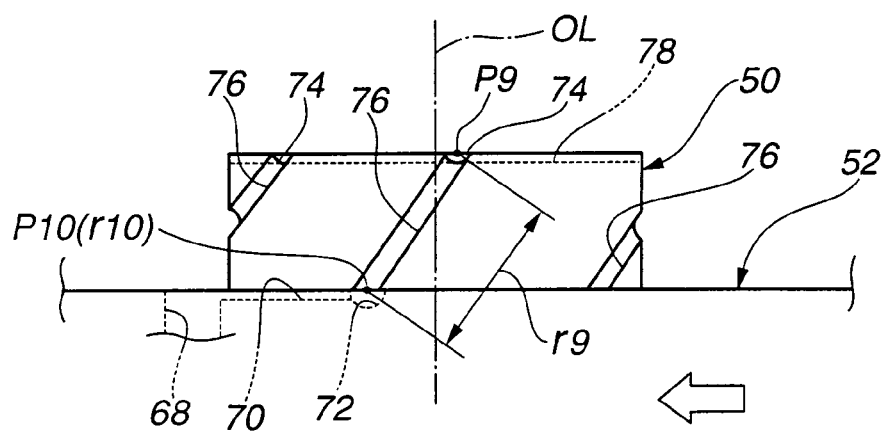
FIG. 23 is a schematic view showing inclination of each of third guide grooves with respect to the normal rotation direction; and, FIG. 24 is a schematic view showing inclination of each of second guide grooves with respect to the normal rotation direction.

As is understood from FIGS. 20 and 23, annular bearing projection 50 is formed at its leading end with five evenly spaced second guide grooves 74, at its cylindrical outer surface (see FIG. 23) with five evenly spaced third guide grooves 76, and at its leading end with a circular guide groove 78. As is seen from these drawings, second guide grooves 74 are respectively connected to third guide grooves 76, and connected to circular guide groove 78. Circular guide groove 78 extends around the rotation axis OL of differential case 5.

As is seen from FIG. 20, each of first guide grooves 70, each of second guide grooves 74 and each of third guide grooves 76 are inclined toward the normal rotation direction.

The inclination of such grooves 70, 74 and 76 may be well understood from the following description.

Figure 22:
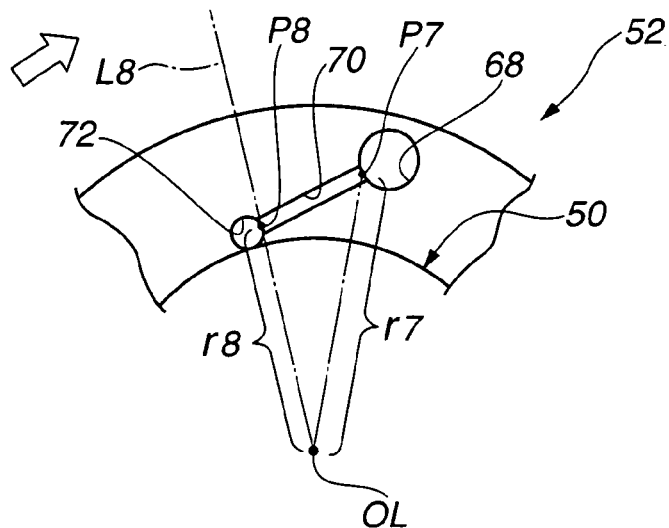
FIG. 22 is a schematic view showing inclination of each of first guide grooves with respect to the normal rotation direction.

As is seen from FIG. 22, the inclination of each first guide groove 70 is so made that a distance "r7" between an outer end "P7" of the groove 70 and the rotation axis OL is greater than a distance "r8" between an inner end "P8" of the groove 70 and the rotation axis OL, and the outer end "P7" is positioned at a leading side with respect to an imaginary line L8 that passes through the inner end "P8" and the rotation axis OL. As shown, the diameter of through opening 68 is larger than the width of the groove 70.

As is seen from FIG. 23, the inclination of each of third guide grooves 76 is so made that a distance "r9" between an outer end "P9" of the groove 76 and the corresponding recessed end 72 is greater than a distance "r10" between an inward end "P10" of the groove 76 and the recessed end 72, and the outer end "P9" is positioned at a trailing side with respect to the normal rotation direction.

Figure 24:
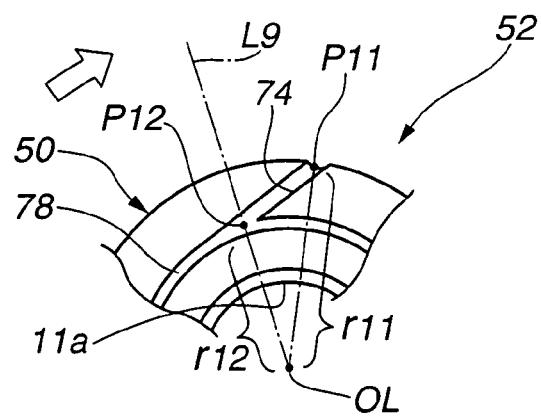

As is seen from FIG. 24, the inclination of each of second guide grooves 74 is so made that a distance "r11" between an outer end "P11" of the groove 74 and the rotation axis OL is greater than a distance "r12" between an inner end "P12" of the groove 74 and the rotation axis OL, and the outer end "P11" is positioned at a leading side with respect to an imaginary line L9 that passes through the inner end "P12" and the rotation axis OL.

Although not shown in the drawings, the inner surface 64 of second conical portion 19 has substantially the same structure as that of the inner surface 52 of the above-mentioned first conical portion 32. That is, the inner surface 64 has such a structure as shown in FIG. 20.

In the following, operation will be described with reference to the drawings, especially FIGS. 20 and 21.

When, as is seen from FIG. 21, under forward movement of an associated motor vehicle, differential 500 is rotated about the rotation axis OL in a normal direction, that is, in the direction indicated by an arrow, the ribs 66 formed on first conical portion 32 (and also on second conical portion 19) come into the oil level HL dipping up the lubricating oil. The oil thus dipped up is led into the interior of differential case 5 through the openings 68. Then, as is seen from FIG. 20, the oil is enforcedly guided to circular guide 78 through first, third, second guide grooves 70, 76 and 74, and finally reach left side gear 43 (and also right side gear 43, see FIG. 19).

As is described hereinabove, the inclination of first, third and second guide grooves 70, 76 and 74 toward the normal rotation direction functions to force the lubricating oil to reach the side gears 43.

In fourth and fifth embodiments 400 and 500, one piece differential case 5 is used. However, if desired, two-piece differential case, such as that of first, second or third embodiment, may be also used in the embodiments 400 and 500.

Furthermore, in fourth and fifth embodiments 400 and 500, only two pinion gears 42 are used. However, if desired, like first, second and third embodiments 100, 200 and 300, four pinion gears 42 may be used.

The entire contents of Japanese Patent Applications 2003-075199 and 2003-082489 (filed Mar. 19, 2003 and Mar. 25, 2003 respectively) are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A differential for a wheeled motor vehicle, comprising:
   a differential gear unit including pinion gears rotatably held by respective pinion shafts;
   a differential case for housing therein the differential gear unit, the differential case having at an inner wall thereof grooves for respectively receiving therein the pinion shafts, the differential case being rotatable about a rotation axis thereof in normal and reverse directions at a position above an oil level of a lubricating oil, the differential case having an oil inlet opening formed therethrough, the oil inlet opening communicating the interior of the differential case with the outside of the same; and
   an oil scooping up structure adapted to scoop up the lubricating oil to force the oil to enter the interior of the differential case through the oil inlet opening when the differential case rotates about the rotation axis in the normal direction,
   wherein the oil scooping up structure comprises:
      first projected portions formed on an outer surface of the differential case at portions that support the pinion shafts through the grooves, the first projected portions having an inclined surface at a leading side thereof with respect to the normal rotation direction, the inclined surface defining an acute angle relative to a tangential line of the outer surface of the differential case at a center point of the respective projection portion, wherein cavities are present in the first projected portions forming the grooves, the cavities extending in a radial direction away from the rotation axis.

2. A differential as claimed in claim 1, in which the oil scooping up structure is integral with a major portion of the differential case.

3. A differential as claimed in claim 1, in which the differential case is produced through a forging technique that provides for a thin wall of the differential case.

4. A differential as claimed in claim 1, in which the oil scooping up structure is shaped to push the lubricating oil toward the oil inlet opening when the differential case rotates in the normal direction.

5. A differential as claimed in claim 4, in which the oil inlet opening is positioned at a leading side of a respective first projected portion with respect to the normal rotation direction.

6. A differential as claimed in claim 5, in which at least a trailing part of a peripheral edge surface of the oil inlet opening defines an obtuse angle relative to a tangential line of the outer surface of the differential case at a center point of the oil inlet opening.

7. A differential as claimed in claim 5, in which two second projected portions are formed on the outer surface of the differential case at a diametrically opposed position with respect to each other, the two second projected portions being substantially the same in shape, and in which another oil inlet opening is formed in the differential case, which is positioned at a leading side of one of the second projected portions and is substantially the same in shape as the oil inlet opening positioned at the leading side of the respective first projected portion.

8. A differential as claimed in claim 4, in which the oil scooping up structure further comprises at least one wall portion provided by the differential case at a trailing position of another oil inlet opening formed in a trailing location, the wall portion having an inclined surface at a leading side thereof with respect to the normal rotation direction, the inclined surface defining an acute angle relative to the tangential line of the outer surface of the differential case.

9. A differential as claimed in claim 8, in which at least a trailing part of a peripheral edge surface of said another oil inlet opening defines an acute angle relative to the tangential line of the outer surface of the differential case at a center point of said another oil inlet opening.

10. A differential as claimed in claim 1, in which the oil scooping up structure comprises at least one raised up wall portion provided by the differential case at a trailing position of the oil inlet opening with respect to the normal rotation direction, the raised up wall portion having an inclined surface at a leading side thereof with respect to the normal rotation direction, the inclined surface defining an acute angle relative to the tangential line of the outer surface of the differential case at the raised up wall portion.

11. A differential as claimed in claim 10, in which at least a trailing part of a peripheral edge surface of the oil inlet opening defines an acute angle relative to the tangential line of the outer surface of the differential case at a center point of the oil inlet opening.

12. A differential as claimed in claim 11, in which the raised up wall portion is a separate member which is detachably connected to the oil inlet opening.

13. A differential as claimed in claim 1, in which the oil scooping up structure comprises at least one of the first projected portions formed on the outer surface of the differential case, the at least one first projected portion having at a leading side wall a trailing part of the oil inlet opening.

14. A differential as claimed in claim 1, in which the oil scooping up structure comprises a corrugated inner surface of a given portion of the differential case, the given portion extending around the rotation axis, corrugations of the corrugated inner surface being inclined toward the normal rotation direction.

15. A differential as claimed in claim 14, in which the corrugated inner surface comprises:
a plurality of rounded bank portions that are arranged around the rotation axis defining between adjacent bank portions an oil guide groove that extends radially inward toward the rotation axis, the rounded bank portions being inclined relative to the normal rotation direction;
a plurality of raised portions that are arranged in a path of the rounded bank portions, the raised portions being inclined relative to the normal rotation direction; and
a plurality of guide grooves provided on an annular bearing projection of the differential case, the annular bearing projection bearing a side gear and the plurality of guide grooves being inclined relative to the normal rotation direction.

16. A differential as claimed in claim 15, in which an inclination of the respective guide grooves defined by the adjacent rounded bank portions is such that a distance between an outer end of respective guide grooves and the rotation axis is greater than a distance between an inner end of the respective guide grooves and the rotation axis and the outer end of the respective guide grooves is positioned at a leading side with respect to an imaginary line that passes through the inner end of the respective guide grooves and the rotation axis.

17. A differential as claimed in claim 16, in which an inclination of the respective raised portions is so made that a distance between an outer end of respective raised portions and the rotation axis is greater than a distance between an inner end of respective raised portions and the rotation axis and the outer end of the respective raised portions is positioned at a leading side with respect to an imaginary line that passes through the inner end of the respective raised portions and the rotation axis.

18. A differential as claimed in claim 17, in which the inclination of the guide grooves is so made that a distance between an outer end of the respective guide grooves and the rotation axis is greater than a distance between an inner end of the respective guide grooves and the rotation axis and the outer end is positioned at a leading side with respect to an imaginary line that passes through the inner end of the respective guide grooves and the rotation axis.

19. A differential as claimed in claim 1, in which the oil inlet opening is formed in an axial end portion of the differential case, and the oil scooping up structure comprises at least one rib formed on the outer surface of the axial end portion of the differential case such that when the differential case rotates, the rib is rushed into the oil level and pulled up from the oil level to dip up and force the lubricating oil to flow toward the oil inlet opening.

20. A differential as claimed in claim 19, in which an inner surface of the axial end portion of the differential case is formed with at least one oil guiding path through which the lubricating oil is guided from the oil inlet opening to an annular bearing projection, the annular bearing projection bearing a side gear.

21. A differential as claimed in claim 20, in which the oil guiding path comprises:
a first guide groove that extends from the oil inlet opening to a recessed end near the annular bearing projection;
a second guide groove formed on a leading end of the annular bearing projection;
a third guide groove formed on a cylindrical outer surface of the annular bearing projection; and
a circular guide groove formed on the leading end of the annular bearing projection.

22. A differential as claimed in claim 1, in which the differential case is of a split type including a first case half and a second case half which are coupled together.

23. A differential as claimed in claim 1, in which the differential gear unit is of a type having four pinion gears and two side gears.

24. A differential as claimed in claim 1, in which the differential gear unit is of a type having two pinion gears and two side gears.

25. A differential as claimed in claim 1, wherein the cavities terminate at a first distance from the rotation axis, the first distance being greater than a maximum distance of the oil inlet opening from the rotation axis.

26. A differential as claimed in claim 25, in which the pinion shafts are located in the respective cavities.

27. A differential case for a differential of a wheeled motor vehicle, comprising:
a case proper, the case proper being adapted to house therein a differential gear unit, the case proper having at an inner wall thereof grooves for respectively receiving therein pinion shafts that rotatably hold pinion gears, respectively, wherein, with respect to a portion of the case proper, the portion of the case proper has an oil inlet opening formed therethrough, the oil inlet opening communicating the interior of the case proper with the outside of the same; and
an oil scooping up structure integrally formed by the case proper for scooping up a lubricating oil to force the same to enter the interior of the case proper through the oil inlet opening when rotated in the lubricating oil about a rotation axis thereof, wherein the oil scooping up structure comprises:
- first projection portions formed on an outer surface of the case proper at portions that support the pinion shafts through the grooves, the first projection portions having an inclined surface at a leading side thereof with respect to the normal rotation direction, the inclined surface defining an acute angle relative to a tangential line of the outer surface at a center point of the projection portions, wherein cavities are present in the first projection portions forming the grooves, the cavities extending in a radial direction away from the rotation axis.

28. A differential case as claimed in claim 27, in which the oil scooping up structure is shaped to increase forcing of the lubricating oil toward the oil inlet opening when the case proper is rotated about the rotation axis in a normal direction that induces a forward movement of the motor vehicle.

29. A differential case as claimed in claim 28, in which the case proper is of a split type including a first case half and a second case half which are coupled together.

30. A differential case as claimed in claim 27, wherein the cavities terminate at a first distance from the rotation axis, the first distance being greater than a maximum distance of the oil inlet opening from the rotation axis.

31. A differential case as claimed in claim 30, in which the pinion shafts are located in the respective cavities.

* * * * *